United States Patent [19]

Farris et al.

[11] Patent Number: 5,592,477

[45] Date of Patent: Jan. 7, 1997

[54] VIDEO AND TELCO NETWORK CONTROL FUNCTIONALITY

[75] Inventors: Robert D. Farris, Sterling; Dale L. Bartholomew, Vienna, both of Va.

[73] Assignee: Bell Atlantic Network Services, Inc., Arlington, Va.

[21] Appl. No.: 539,646

[22] Filed: Oct. 5, 1995

Related U.S. Application Data

[63] Continuation-in-part of Ser. No. 302,472, Sep. 12, 1994, Pat. No. 5,541,917, and Ser. No. 524,306, Sep. 6, 1995.

[51] Int. Cl.[6] ............................. H04J 3/12; H04M 3/42; H04M 7/00
[52] U.S. Cl. ..................... 370/396; 379/207; 379/220; 379/230; 348/7; 348/13; 370/401; 370/410
[58] Field of Search ................................. 370/58.1, 58.2, 370/58.3, 60, 60.1, 62, 68.1, 85.13, 94.1, 94.2, 110.1; 379/207, 212, 230, 220, 112, 94, 201, 219, 221, 224, 229; 348/6, 7, 12, 13; 455/3.1, 5.1, 6.1

[56] References Cited

U.S. PATENT DOCUMENTS

| | | | |
|---|---|---|---|
| 4,191,860 | 3/1980 | Weber | 379/115 |
| 4,506,387 | 3/1985 | Walter | 455/6.1 |
| 4,611,094 | 9/1986 | Asmuth | 379/207 |
| 4,611,096 | 9/1986 | Asmuth | 379/230 |
| 4,763,191 | 8/1988 | Gordon et al. | 379/246 |
| 4,949,187 | 8/1990 | Cohen | 348/10 |
| 4,963,995 | 10/1990 | Lang et al. | 348/384 |
| 5,025,468 | 6/1991 | Sikind et al. | 379/309 |
| 5,027,400 | 6/1991 | Baji et al. | 348/10 |
| 5,057,932 | 10/1991 | Lang et al. | 348/384 |
| 5,115,426 | 5/1992 | Spanke | 370/60 |
| 5,130,792 | 7/1992 | Tindell et al. | 379/105 |
| 5,132,992 | 7/1992 | Yurt et al. | 348/10 |
| 5,133,079 | 7/1992 | Ballantyne et al. | 455/4.1 |
| 5,241,588 | 8/1993 | Babson, III et al. | 379/230 |
| 5,247,347 | 9/1993 | Litteral et al. | 379/105 |
| 5,247,571 | 9/1993 | Kay et al. | 379/230 |
| 5,253,275 | 10/1993 | Yurt et al. | 375/240 |
| 5,278,889 | 1/1994 | Papanicolaou et al. | 379/230 |
| 5,384,771 | 1/1995 | Isidoro et al. | 370/58.2 |
| 5,473,679 | 12/1995 | La Porta et al. | 370/58.1 |

*Primary Examiner*—Alpus H. Hsu
*Assistant Examiner*—Seema S. Rao
*Attorney, Agent, or Firm*—Lowe, Price, LeBlanc & Becker

[57] ABSTRACT

An Intelligent Signaling Transfer Point (ISTP) of the common channel interoffice signaling (CCIS) network provides high level control of signaling message routing and of processing of calls relating to telephone services, broadcast services, interactive broadband services and packet switched data services. A network in accord with present invention includes central office telephone switching systems and local routers. Each local router also is coupled through a trunk circuit to one of the telephone switching systems. The local router selectively provides switched telephone call communications services to a plurality of telephone stations coupled thereto. The local router also receives broadband digital signals from a broadband trunk circuit and selectively supplies broadband digital signals to a plurality of digital terminals. The ISTP includes a data switch, a database and a program controlled processor. The switch switches signaling messages between signaling links coupled to the switching systems and the local routers. The database stores call processing data for control of at least some call processing through both the telephone central office switching system and the local router. The program controlled processor recognizes a predetermined condition with regard to at least one call related signaling message from any of the switching systems or local routers during processing of any service call. In response, the processor obtains call processing information from the database, and transmits a signaling message containing the call processing information to the central office switching system or the local router to control subsequent processing of the call.

34 Claims, 10 Drawing Sheets

VIDEO AND TELCO NETWORK CONTROL FUNCTIONALITY

CROSS-REFERENCE TO RELATED APPLICATION

This application is a continuation-in-part of U.S. patent application Ser. No. 08/302,472 filed on Sep. 12, 1994 entitled 'Video and TELCO Network Control Functionality', now U.S. Pat. No. 5,541,917 and a continuation-in-part of U.S. patent pending application Ser. No. 08/524,306 filed on Sep. 6, 1995 entitled 'Intelligent Signal Transfer Point', the disclosures of which are entirely incorporated herein by reference.

TECHNICAL FIELD

The present invention relates to an integrated dial tone network, controlled by an Intelligent Signaling Transfer Point (ISTP), to perform various functions related to providing subscribers an array of voice, data and broadband services. Various switch points of the network which provide voice, packet data or broadband (video) switching or combinations thereof all are equipped as Service Switching Points (SSP's) to communicate with and respond to control data from the ISTP.

BACKGROUND

Distribution of full motion video data has evolved from early television broadcasting to meet viewer demand. Earliest video distribution was by point-to-point wiring between a camera and a video monitor. This was followed by scheduled television broadcasting of programming over the public air waves. In the 1960s, Community Antenna Television (CATV) was chartered to provide off-air television signals to viewers in broadcast reception fringe areas. Later, FCC regulation required the CATV industry to provide local access and original programming in addition to off-air broadcast signal distribution.

In response, several sources of cable network programming evolved. Because of the wide bandwidth available on cable television systems, additional channels were available for the new programming. However, programming was generally prescheduled, with the viewer left to tune to the designated channel at the appointed time to view a particular program.

To increase revenues, cable television systems have initiated distribution of premium channels viewable only by subscribers having appropriate descramblers. The subscriber tunes the descrambler to receive a premium channel, descramble the video and audio information and supply a signal capable of reception on a standard television set. Pay-per-view programs, which evolved later, include recently released movies, live concerts and popular sporting events. Subscribers wishing to view a pay-per-view program place an order with the cable operator. At the designated time, the subscriber's descrambler is activated by some control from the cable operator to permit viewing of the pay-per-view programming. However, the subscriber is still restricted to viewing the programming at the scheduled time. There is no capability of delivering programming to a subscriber on demand, that is, immediately or at a subscriber-specified time and date.

More recently, several different wideband digital distribution networks have been proposed for offering subscribers an array of video services, including true Video On Demand service. The following U.S. Pat. Nos. disclose representative examples of such digital video distributions networks: 5,253,275 to Yurt et al., 5,132,992 to Yurt et al., 5,133,079 to Ballantyne et al., 5,130,792 to Tindell et al., 5,057,932 to Lang, 4,963,995 to Lang, 4,949,187 to Cohen, 5,027,400 to Baji et al., and 4,506,387 to Walter. In particular, Litteral et al. U.S. Pat. No. 5,247,347 discloses a digital video distribution network providing subscribers with access to multiple service providers through the public switched telephone network.

As the digital networks evolve to provide equal access to multiple service providers, the network functionality approaches a video "dial tone" network functionality somewhat analogous to the dial tone call-up functionality available through the telephone network. FIG. 10 is a block diagram of one type of broadband network for providing telephone service as well as interactive services, such as video on demand, home shopping or purchasing, home banking, medical information, ticket ordering, gaming, etc. from a plurality of service providers. The illustrated network is an improvement over the network disclosed in the above noted Litteral et al. Patent.

In the network shown in FIG. 10, the customer premises equipment (CPE) consists of a set top terminal type Digital Entertainment Terminal (DET) 700 and a telephone (POTS or ISDN). The connections to the network utilize Asymmetrical Digital Subscriber Line (ADSL) frequency division multiplexing technology, typically over twisted wire pair. The ADSL connection provides a 1.5 Mb/s downstream video information channel, a two-way telephone connection and a two-way 16 kbit/s control channel. The ADSL technology is described in more detail in the Litteral et al. Patent. The illustrated Video Dial Tone network architecture may use some form of fiber extension in the actual subscriber loops, to provide services to subscribers located more than 1.5 kilo-feet from a central office (see e.g. U.S. patent application Ser. No. 08/233,579, in the name of Bruce Kostreski, filed Apr. 26, 1994, 1994 and entitled "Extended Range Video On Demand System". In the illustrated network, the drop to the subscriber's premises is always a wired ADSL loop.

In the network of FIG. 10, the DET 700 connects to an ADSL multiplexer/demultiplexer 701 similar to the in-home ADSL unit in the above discussed Litteral et al. Patent. Each ADSL subscriber line 703 will connect to an ADSL bay 705 located in or associated with the subscriber's local telephone company central office. For each subscriber line 703, the ADSL bay 705 includes an ADSL multiplexer/demultiplexer similar to the central office ADSL unit in the above discussed Litteral et al. Patent.

The ADSL bay 705 provides transport for voice signals on the subscriber loop to and from the associated voice switch 707. The ADSL bay 705 also connects to an access concentrator 709 for providing two-way signaling connections through an X.25 type packet switched data network 711. The ADSL bay 705 also receives broadband digital signals for downstream transport over the ADSL line 703 to each subscriber's premises from a digital cross connect switch 713, labelled "Access DCS" in the drawing. One ADSL line to the home carries one channel of video programming and provides a single output channel. The output channel can provide a video signal to a VCR or to the TV set 700'. The various Access DCS switches throughout the network are controlled by switch controller 712.

If the ADSL bay 705 is local, i.e. located in the same telephone company central office as the cross connect switch DCS 713, the ADSL bay 705 connects to the Access DCS 713 via an appropriate number of local DS1 connections 715. In service areas where an ADSL bay does not carry enough traffic to warrant an associated Access DCS, the ADSL bay will be located in a remote central office facility. Such a remote ADSL bay connects to the Access DCS 713 via a SONET type optical fiber link 717 providing an appropriate number of multiplexed channels to service the number of subscribers connected to the particular ADSL bay.

The Access DCS 713 provides both point-to-point connections and point-to-multipoint connections. Individualized interactive services, such as Video On Demand, home shopping/purchasing and banking, use point-to-point connections wherein the Access DCS connects one broadband input port from a VIP's server to one output port going to the subscriber's ADSL line. Narrowcast and broadcast services utilize point-to-multi-point connections of one input port to a plurality of output ports.

The illustrated architecture of the Video Dial Tone network utilizes two levels of gateways, both of which will communicate with subscribers' DET's via the X.25 data network 711 and the signaling channel on the ADSL subscriber loops 703. The level 1 gateway 721 performs a variety of network connectivity related functions, including communications port management of transmissions of information between subscribers and servers, processing of billing information and session management. A level 2 gateway provides a number of services for the Information Providers. These services include transmission of menus of available information to subscribers, searches of available information, targeted advertisement insertion, previews, trailers, control of an associated file server, etc.

The Video Dial Tone network of FIG. 10 provides video on demand and closely related interactive multimedia services. For example, using the upstream data channel, the subscriber can send a request for a particular movie, and the VIP's server will retrieve and transmit that movie as an MPEG (Moving Pictures Experts Group) digital data stream on the 1.5 Mb/s downstream channel to the digital audio/video processor in the subscriber's DET 700. The DET converts the digital data stream to a signal for driving a standard television set for real time viewing of the movie by the subscriber.

When the subscriber turns on the DET 700, the loader routine and/or operating system within the DET will control wake up, and the DET will transmit an initial message intended for the level 1 gateway. In the network of FIG. 10, the message is carried over the 16 kbit/s signaling channel on the ADSL subscriber's line. The access concentrator 709 uses the X.121 address of the level 1 gateway 721 and the X.121 address associated with the calling subscriber's line 703 to initiate an X.25 packet data call to the level 1 gateway 721. As part of this call, the access concentrator 709 packetizes each message from the DET 700 and adds header information to facilitate transport through an assigned virtual circuit through the X.25 network 711 to the gateway 721. In response to the initial message, the level 1 gateway 721 transmits ASCII text representing one ore more pages of a VIP selection menu back to the DET 700 through the assigned virtual circuit through the X.25 network 711 and the signaling channel on the subscriber's line 703. Upon receipt of the menu data, the DET 700 would display an initial selection menu on the subscriber's television set 700'.

The subscriber may review the menu on their television set, and then input a selection using the infrared remote control device, either by moving a cursor to an appropriate point on the screen and hitting <ENTER> or by inputting digits followed by <ENTER>. In response to the VIP selection input, the DET 700 will transmit an appropriate data signal upstream through the network to the level 1 gateway 721.

As part of the X.25 call set up procedure, the access concentrator 709 identified the subscriber and included an X.121 address for the X.25 network port assigned to the subscriber in the initial signaling packet sent through the X.25 network. The level 1 gateway 721 receiving X.25 packets of DET signaling data therefore knows the X.121 address of the calling subscriber. The level 1 gateway 721 uses that information together with the VIP selection input to initiate an X.25 data call to the VIP's level 2 gateway to ask if the subscriber is a valid customer of the particular VIP. If the level 2 gateway indicates that the subscriber is valid, the level 1 gateway 721 initiates a call through switch controller 712 to instruct the appropriate digital cross connect switch DCS 713 to set up a downstream broadband link from the VIP's file server to the subscriber's DET 700 and drops the X.25 communication link to the DET. At approximately the same time, the VIP's level 2 gateway initiates an X.25 packet data call to the subscriber's DET 700. Completion of set-up of both the broadband link and the X.25 signalling link to the DET establishes an interactive video session between the VIP's gateway and server system 752 and the subscriber's DET 700.

Once a session is established, the level 2 gateway executes a two-way communication with the DET 700 through the X.25 network 711 and the signaling channel to obtain a selection or other relevant input from the subscriber. In response, the level 2 gateway provides a signal to the associated file server instructing the server to initiate transmission of selected audio/video program materials from memory through the output port which the DCS 713 has currently connected to the subscriber's line 703. The connection through the DCS routes the downstream broadband transmission to the ADSL bay 705, and within that bay, to the ADSL multiplexer/demultiplexer serving the subscriber's line for transmission over the line 703. The ADSL multiplexer/demultiplexer 701 demultiplexes the broadband signal carrying MPEG encoded audio/video material and applies that signal to the subscriber's DET 700 for decoding and display on the television set 700'.

A more detailed description of the network of FIG. 10, with particular emphasis on the network control functionality of the level 1 gateway, appears in commonly assigned U.S. patent application Ser. No. 08/304,174 filed on Sep. 12, 1994 entitled "LEVEL 1 GATEWAY FOR VIDEO DIAL TONE NETWORKS", the disclosure of which is incorporated herein in its entirety by reference.

Although the final drop into the subscriber's home is over telephone lines and some of the network equipment resides in telephone company central office buildings, the prior art video dial tone network makes no use whatsoever of routing control functionality of the existing telephone network. The gateways and servers are all separate components newly developed and added over and above the telephone network. Development and deployment of such new equipment adversely impacts the cost of implementing the video dial tone network.

Also, the use of gateways in the manner discussed above results in multiple call switching to set up each individual interactive broadband session between a service provider (VIP) and the subscriber's DET. Specifically, the X.25 communication between the DET and the level 1 gateway is a first call. The X.25 communication between the level 1 and level 2 gateways to determine the validity of the calling subscriber is a second call. The switch controller 712 typically comprises another data communication system to permit the level 1 gateway to control a plurality of DCS switches. The instruction to set up a broadband link through a selected DCS therefore may also be viewed as another data call, i.e. between the level 1 gateway and the particular DCS 713 which will provide the switched broadband connection. The two-way X.25 signaling connection between the level 2 gateway and the subscriber's DET would be a fourth call, and the fifth and final call through the network would be the actual broadband link downstream from the server to the DET. Such multiple switching is an inefficient use of resources and consumes excessive time during initial set-up of sessions between the DET and the service provider's equipment.

Concurrent with recent developments in digital distribution of broadband services outlined above, the telephone industry has been developing an enhanced telephone network, sometimes referred to as an Advanced Intelligent Network (AIN), for providing a wide array of new voice grade telephone service features (see for example commonly assigned U.S. Pat. No. 5,247,571). In an AIN type system, local and/or toll offices of the public telephone network detect one of a number of call processing events identified as AIN "triggers". For ordinary telephone service calls, there would be no event to trigger AIN processing; and the local and toll office switches would function normally and process such calls without referring to the central data base for instructions. An office which detects a trigger will suspend call processing, compile a call data message and forward that message via a common channel interoffice signalling (CCIS) link to an Integrated Service Control Point (ISCP) which includes a Multi-Services Application Platform (MSAP) data base. If needed, the ISCP can instruct the central office to obtain and forward additional information. Once sufficient information about the call has reached the ISCP, the ISCP accesses its stored data tables in the MSAP data base to translate the received message data into a call control message and returns the call control message to the office of the network via CCIS link. The network offices then use the call control message to complete the particular call.

An AIN type network for providing an Area Wide Centrex service, for example, was disclosed and described in detail in commonly assigned U.S. Pat. No. 5,247,571 to Kay et al., the disclosure of which is entirely incorporated herein by reference. U.S. Pat. No. 5,241,588 to Babson, III et al. discloses graphical approaches to creating and implementing new customer service procedures for individual customers of an intelligent telephone network.

To date, the AIN telephone network has been a separate technical area of development, with at most limited interaction between the AIN and the video networks. For example, U.S. Pat. No. 4,763,191 to Gordon et al. discloses a method for providing a nationwide dial-a-view service in which a caller desiring a given viewing selection dials an INWATS "800" dial-a-view number for ordering that selection through the telephone networking arrangement. A central data base system provides the originating toll office with routing instructions for sending the request to network services equipment. The network services equipment acknowledges the caller's request for cable services and processes the dial-a-view request. The network services equipment provides relevant data to cable television distribution equipment to control actual supply of requested programming to the calling subscriber. Separate vendor equipment supplies the requested programming to the calling customer via activation of an addressable decoder at the calling customer's television. The telephone network components still do not directly control actual routing of program materials through the broadband network.

As another example, U.S. Pat. No. 5,278,889 to Papanicolaou et al. discloses a two-way video telephone system using a combination of a two-way cable television distribution system and an intelligent voice telephone network. The video distribution networks used apparently are existing frequency division multiplexed analog transmission systems. As part of the disclosed call processing, a central data base responds to video telephone call dialing information by providing instructions to the network to route the video portion of the call through a digital inter-exchange carrier network between points of presence of two of the cable television distribution networks.

From the above discussion of the prior art it becomes clear that a need still exists to more closely integrate elements of the existing AIN telephone network with the new video dial tone and packet data networks, particularly for purposes of providing a uniform control of all routing through the integrated network.

DISCLOSURE OF THE INVENTION

In the prior case, U.S. patent application Ser. No. 08/302,472 filed on Sep. 12, 1994 entitled 'Video and TELCO Network Control Functionality', it was disclosed that various nodes or switching points in the network, which perform routing functions for each of the different types of services, were controlled from a common central controller. Requests for broadband data (e.g. video), narrowband data (e.g. text) and voice services all are treated as 'calls'. The various network nodes all are capable of recognizing certain call processing events as triggers. In response to a trigger, such a node will suspend processing of the particular call and obtain routing instructions from the central controller as to how to complete call processing. In the preferred embodiment, the central controller was an Integrated Services Control Point (ISCP) of the Advanced Intelligent Network (AIN).

The intelligent call processing provided by the ISCP type central controller facilitates a wide range of services, many of which can be customized to meet the needs of individual subscribers. However, servicing a large number of customers in this manner, particularly where every call to or from every intelligent service subscriber receives query and response processing through a centralized data base, places a heavy signaling burden on the interoffice signaling network. Also, typically, a query and response cycle between a switching office or other call processing node and a remote data base requires approximately 600 microseconds. Although this time appears short to a person placing a call, the delay is quite long in terms of electronic or computer processing capabilities by the switching offices. During this waiting time, resources of the switch or other network element that launched the query are sitting idle, reserved for the requested service but waiting for the response from the data base. When multiplied by millions of service requests for telephone, data and broadband services, the waiting time burdens network resources that otherwise could be processing other calls or service requests and thereby generating additional revenue. As the number of intelligent services utilizing the query and response procedure continues to increase, the need for a more rapid technique for provide the necessary control information to the network elements becomes increasingly acute.

The present invention provides a further improvement over the art as well as an improvement over the solution in the earlier case by moving the high level control functionality to packet switching nodes of the signaling network, i.e. to signaling transfer points. A database associated with, and preferably incorporated into, the signaling transfer point stores data tables to provide intelligent routing control. The intelligent routing functionality applies to routing of signaling messages relating to service calls as well as to the actual routing of the service calls. The signaling transfer point also is adapted to trigger access to records within that database in response to signaling messages when certain conditions are met. The signaling transfer point effectively becomes an intelligent node of the network, i.e. an Intelligent Signaling Transfer Point (ISTP).

A network implementing the present invention includes local narrowband communication links, at least one telephone trunk circuit, and a broadband trunk circuit supplying broadband digital service signals. At least one telephone central office switching system selectively provides switched telephone call communications services to a plurality of telephone stations coupled thereto through the local narrowband communication links. A local router is coupled to the telephone central office switching system through the telephone trunk circuit. The local router also is coupled to the broadband trunk circuit. The local router selectively provides switched telephone call communications services to a plurality of telephone stations and selectively provides broadband digital services to a plurality of digital terminals. The network also includes a signaling transfer point for routing signaling messages and signaling links. The signaling links couple the signaling transfer point to the telephone central office switching system and the local router. The signaling links are separate from the local communication links and the trunk circuits.

The signaling transfer point is the ISTP of the present invention. The ISTP includes a data switch for switching messages between the signaling links. A database associated with the signaling transfer point stores call processing data for control of at least some call processing through both the telephone central office switching system and the local router. A program controlled processor recognizes a predetermined condition with regard to at least one call related signaling message from either the central office switching system or the local router, whichever is processing a call. In response to the recognized condition, the processor obtains call processing information from the database, and transmits a signaling message containing the call processing information to the central office switching system or the local router to control subsequent processing of the call.

The ISTP of the present invention effectively screens at least certain signaling messages. The ISTP will respond to some messages, and the ISTP will pass other messages through, e.g. permitting response by some other node on the signaling network. The messages need not necessarily be specialized application messages. Often the messages are standard CCIS type messages used in existing call set-up procedures, however, here the messages are used during set-up of all different types of calls carried through the network. For example, set-up of an interactive session from a terminal to an information provider's system utilizes interoffice signaling type query and response messages identical in format to those used for set-up of a voice grade telephone call. The ISTP accesses the internal database to determine whether the ISTP itself should provide the response or to forward the query to a remote network node to obtain the response.

In this manner, the signaling transfer point can apply intelligent processing to the relevant signaling message routing and the actual processing of calls, for all types of services carried through the communication network. As disclosed, the intelligence of the signaling transfer point controls at least some call processing for broadband broadcast services, broadband point-to-point services, voice grade telephone services and switched data services.

The control of the broadband service routing in a manner similar to CCIS and AIN type telephone call routing eliminates the multiple calls needed to set up a broadband session in the prior art network of FIG. 10. In particular, these inventive procedures eliminate the need for an interactive provider to confirm through a separate data call with some network node that a caller is a subscriber and then initiate both a signaling call and a broadband call back through the network as new calls to the identified subscriber's terminal in order to set up the various links necessary for an interactive session.

From a subscriber's perspective, broadcast channel selection appears identical to channel selection in a CATV like broadcast environment. Calling an interactive service provider or a packet data service provider appears functionally identical to calling or dialling up another party for a voice grade telephone call. Also, the subscriber can use a single digital terminal for both packet data and broadband services.

As noted above, the transmission of messages to a database such as an SCP or ISCP and waiting for a response ties up network resources. The ISTP responds faster to the messages under certain conditions and passes only a limited number of messages, i.e. those meeting specific conditions, to the remote node for processing. Also, the application of the screening functionality to the processing of signaling messages in the ISTP reduces the number of triggers that need to be established in the telephone switching offices and/or the local routers.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

ACRONYMS

The following detailed description uses a large number of acronyms to refer to various services, messages and system components. Although known, use of several of these acronyms is not strictly standardized in the art. For purposes of this discussion, acronyms therefore will be defined as follows:

Address Complete Message (ACM)
Advanced Intelligent Network (AIN)
Answer Message (ANM)
Application Service Part (ASP)
Asynchronous Transfer Mode (ATM)
Backward Indicator Bit (BIB)
Backward Sequence Number (BSN)
Call Processing Record (CPR)
Central Office (CO)
Common Channel Inter-office Signaling (CCIS)
Customer Identification Code (CIC)
Cyclic Redundancy Code (CRC)
Destination Point Code (DPC)
Digital Entertainment Terminal (DET)
Dual Tone Multifrequency (DTMF)
Fill-In Signal Unit (FISU)
Global Title Translation (GTT)
Host Digital Terminal (HDT)
Initial Address Message (IAM)
Integrated Service Control Point (ISCP)
Integrated Service Digital Network (ISDN)
Intelligent Signaling Transfer Point (ISTP)
International Standards Organization (ISO)
Interworking Unit (IWU)
ISDN User Part (ISDN-UP)
Link Service Signaling Unit (LSSU)
Message Signaling Unit (MSU)
Message Transfer Part (MTP)
Moving Picture Experts Group (MPEG)
Multi-Services Application Platform (MSAP)
Network Interface Module (NIM)
Open Systems Interconnection (OSI)
Operations, Maintenance, Application Part (OMAP)
Optical Network Unit (ONU)
Origination Point Code (OPC)
Permanent Virtual Circuit (PVC)
Plain Old Telephone Service (POTS)
Point in Call (PIC)
Point in Routing (PIR)
Service Control Point (SCP)
Service Information Octet (SIO)
Service Switching Point (SSP)
Signaling Connection Control Part (SCCP)
Signaling Link Selection (SLS)
Signaling System 7 (SS7)
Signaling Transfer Point (STP)
SubSystem Number (SSN)
Telephone Operating Company (TELCO)
Transaction Capabilities Applications Protocol (TCAP)
Virtual Path Identifier/Virtual Channel Identifier (VPI/VCI)
Video Information Provider (VIP)
Video Information User (VIU=subscriber)

BEST MODE FOR CARRYING OUT THE INVENTION

Figure 1A:
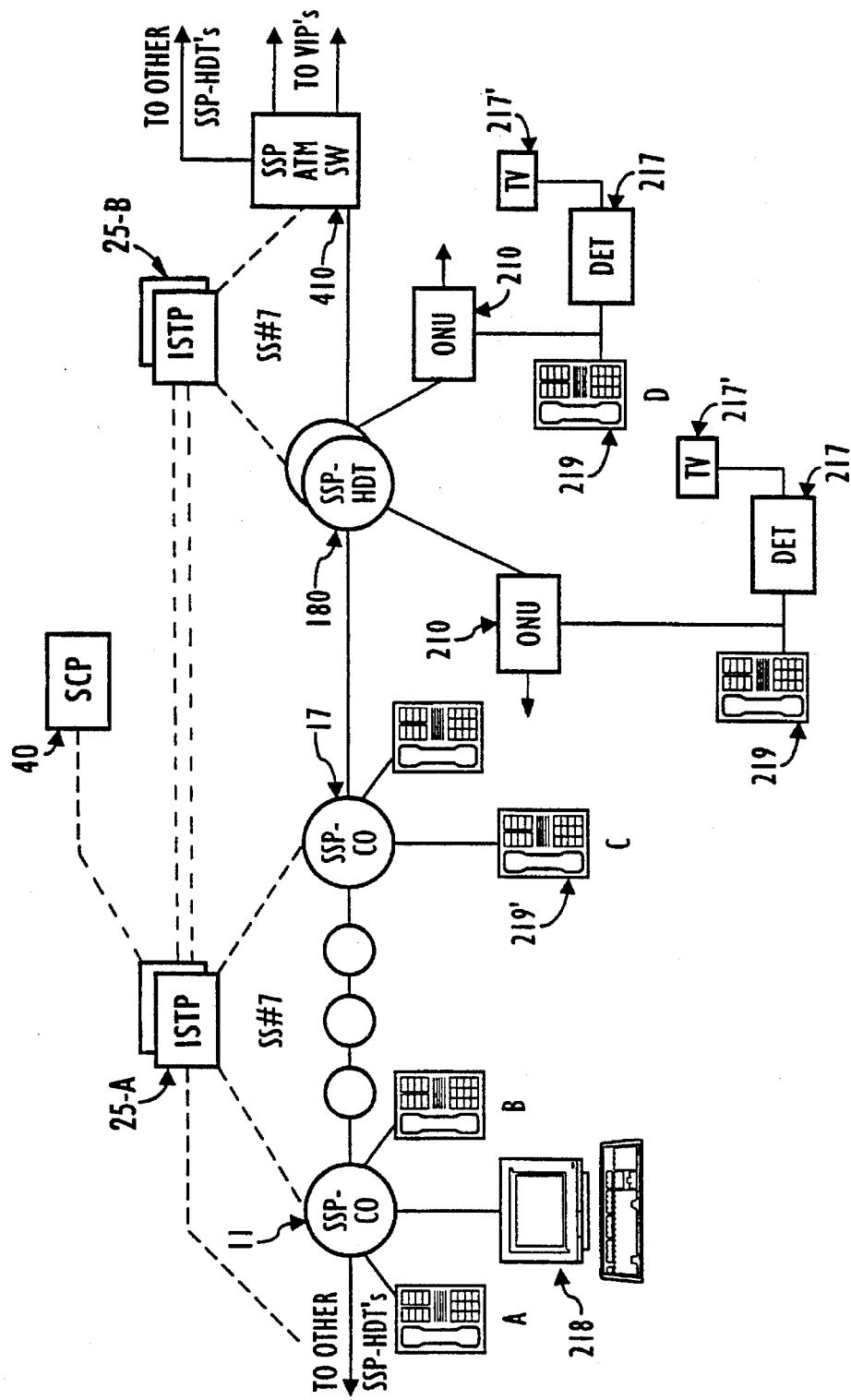
FIG. 1A is a schematic block diagram of an integrated Advanced Intelligent Network (AIN), in accord with the present invention, for providing voice, packet switched data and broadband (video) services. This drawing illustrates the telephone communication portion of the network in detail and provides a simplified functional illustration of some of the broadband network components.
Figure 1B:
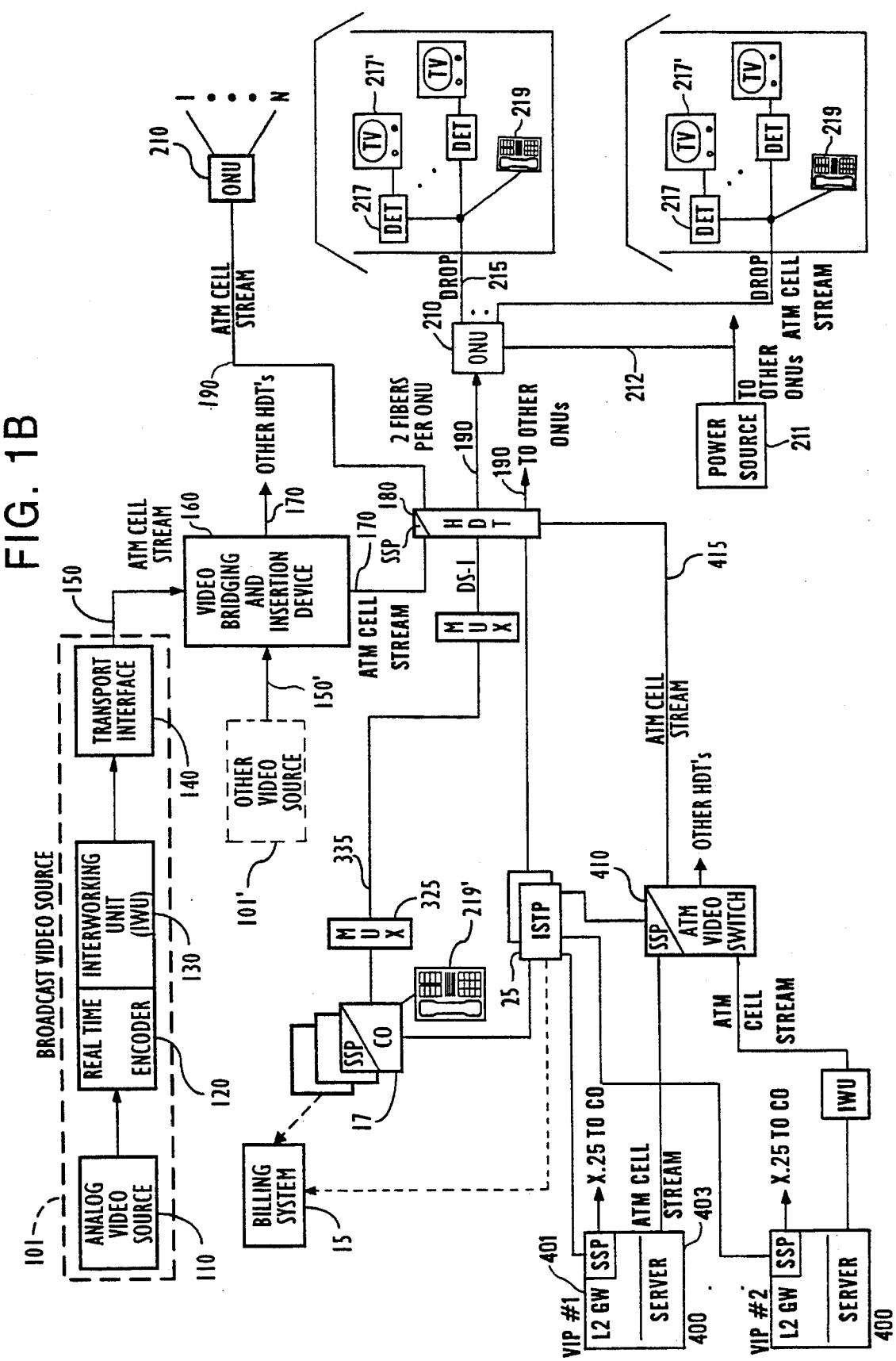
FIG. 1B is an alternate block diagram illustration of the exemplary integrated AIN type network, including several components of the system of FIG. 1A, with additional details regarding the broadband components.

FIG. 1A illustrates an integrated advanced intelligent dial tone network providing voice, data and broadband (e.g., video) communications connectivity, wherein the high level network control functionality resides in one or more Intelligent Signaling Transfer Points (ISTPs). FIG. 1B is an alternate view of that network showing the data and broadband communications elements in more detail. In the typical situation, a local telephone operating company (TELCO) would deploy, operate and maintain such an integrated network. In addition to plain old telephone services and packet switched data services offered by the TELCO, a number of independent information providers offer CATV type broadcasts of broadband information services through the network. Other information providers offer interactive broadband services, such as video on demand.

One or more ISTPs maintain a control data base and use data from that data base to provide unified high level control over communications connectivity for the various types of communications services provided through the integrated network. Various switching points distributed throughout the network recognize triggering events and communicate with an ISTP to determine how to process broadband, packet data and voice grade telephone calls.

The data base associated with the ISTP provides instructions for processing the signaling messages to provide customized call processing services through the communication network. The call processing records effectively specify how the ISTP should process a message under certain predetermined conditions, to provide a subscriber one or more selected service features. For example, the ISTP may pass a query message relating to one subscriber's service under a first condition (e.g. at a first time). Some other network node formulates a response and sends the response back through the ISTP. Under other conditions (e.g. at other times), the ISTP will itself process the query message and provide an appropriate response message.

Essentially, the invention extends the AIN architecture and call processing techniques, developed for voice telephone service, to control packet data and broadband services. The control functions performed by the SSPs and ISTPs on broadband calls essentially eliminates or replaces the functionality of the level 1 gateway in the prior art network. The inclusion or association of the database with the ISTP, however, eliminates the delay incurred by forwarding queries to separate database and waiting for the responses to return to the signaling transfer point for subsequent transport to the switching element which launched the query.

1. Network Architecture

The presently preferred embodiment utilizes the Intelligent Signaling Transfer Points (ISTPs) as the high level control elements. Continuing the analogy to the AIN telephone network, the switch points or service control nodes communicating with and controlled by the ISTP are referred to herein as Service Switching Points. Most of the Service Switching Points, or 'SSP's', are appropriately equipped programmable switches present throughout the network, which recognize AIN type calls, launch queries to the databases (including that in the ISTP) and receive commands and data from the databases to further process the AIN calls. SSP functionality, at least for interoffice signaling, may also reside in other network nodes, such as in information service provider equipment.

In the illustrated example, the network includes a number of end office telephone switching systems 11, 17 providing connections to local communication links coupled to end users stations. Switching systems, such as 11, 17 are interconnected by trunk circuits (shown as bold solid lines). Although not shown, certain voice/data switching offices within the network may function primarily as tandem type offices providing connections between trunk circuits only. As such, the network includes of a series of telephone switching offices interconnected by voice grade trunks.

In the network shown in FIG. 1A, each central office (CO) telephone switching system 11, 17 is labeled as an "SSP." In the illustrated embodiment, the SSP-CO's are end offices. All of the end office telephone switches 11, 17 are equipped and programmed to serve as SSP's. The illustrated embodiment is perhaps an ideal implementation which would make a variety of Advanced Intelligent Network (AIN) type telephone services widely available at the local office level throughout the network. Other AIN implementations for telephone services provide the SSP functionality only at selected points in the telephone portion of the network, and end offices without such functionality forward calls to an SSP switching office having tandem switching capabilities.

SSP capable telephone central office switching systems typically consist of a programmable digital switch with CCIS communications capabilities. One example of an SSP capable telephone CO switch is a 5ESS type switch manufactured by AT&T; but other vendors, such as Northern Telecom and Seimens, manufacture comparable digital switches which could serve as the SSP-CO's. Typically, these CO switches will also include packet data switch capabilities, so that one switching system can offer both voice and packet data communication services. The structure of an exemplary CO which may serve as the SSP type CO's in the system of FIG. 1A will be discussed in more detail below, with regard to FIG. 2.

The SSP-CO's connect to and provide telephone services to voice grade type telephone stations 219. Although shown as telephones in FIGS. 1A and 1B, the voice grade type terminals 219, 219' can comprise any communication device compatible with a voice grade type telephone line. As used herein, the term "telephone station" broadly encompasses telephones and any other device compatible with a voice grade telephone circuit, for example, station devices such as facsimile machines, modems, etc. In the illustrated preferred embodiment, the SSP-CO's also provide packet switched data services to end user data equipment, represented by exemplary terminal 218. Although all of the links to the telephone stations 219' and data devices 218 are illustrated as lines, those skilled in communications arts will recognize that a variety of local transport media and combinations thereof can be used between the end office switches and the actual telephone stations 219' and packet data stations 218, such as twisted wire pairs, subscriber loop carrier systems, radio frequency wireless (e.g. cellular) systems, etc. The telephone central office SSP's are interconnected to each other by voice and/or packet data trunk circuits (illustrated in FIG. 1A as bold lines) for carrying voice grade telephone services and packet data services.

With reference to FIG. 1A, the SSP type CO's 11 and 17 connect to one or more mated pairs of signaling transfer points (ISTPs) 25. Other telephone SSP-CO's (not shown) may connect to the same or additional ISTPs, as needed to meet projected signaling traffic demands. In the illustration in FIG. 1A, a number of data links connect one or more pairs of ISTPs 25 to a number of elements of the network providing broadband services. FIG. 1A shows two pairs of ISTPs, 25-A and 25-B. Data links connect each mated pair of ISTPs 25 to other mated pairs. The ISTPs 25 provide access to the signaling system 7 (SS7) network for all of the SSP capable components of the integrated voice, data and broadband network. The ISTPs 25 provide SS7 signaling packet switching functions exactly the same as signaling transfer points (STPs), however, as discussed more below, the ISTPs include a routing control data base.

The connections to the ISTPs are for signalling purposes. As indicated by the circles below the ISTPs to the left of the drawing, each ISTP can connect to a large number of the SSP-CO's and/or other SSP capable switching points. One or more of the ISTPs 25 may also provide a data link to a services control point (SCP) database 40, for example, for providing destination number information for 800 number calls. The links between the various SSPs and the ISTPs and the link between the ISTP and the SCP are typically SS7 type CCIS interoffice packet switched data communication channels. The ISTP hierarchy can be expanded or contracted to as many levels as needed to serve any size area covered by the Advanced Intelligent Network (AIN) and to service any number of stations and network control nodes.

The network of FIG. 1A provides integrated voice telephone service and broadband services to certain customers. As illustrated, at least one SSP-CO 17 connects to a local router, which in the illustrated embodiment is a host digital terminal (HDT) 180. The local router HDT provides two-way voice and packet data communications, with higher level switching for such communications being provided through one or more of the SSP-CO's. The local router HDT also receives broadband inputs from an ATM (asynchronous transfer mode) switch and from other sources (shown in FIG. 1B) as discussed later. The HDT 180 provides broadband, voice and data services through optical fibers and optical network units (ONU's) 210 to subscribers telephones and digital entertainment terminals (DET's) 217.

In accord with the present invention, all of the local routers (HDT's) 180 in the network are themselves equipped to function as SSP's, at least for broadband services, and preferably for voice and packet data services as well. The ATM switch 410 also is an SSP. As such, the SSP-HDT's 180 and the SSP type ATM switch 410 connect to the ISTPs 25 for signaling communications with each other, with the SSP-CO's, with one or more of the data bases in the ISTPs 23 and with any other databases on the signaling network, such as SCP 40. As shown in FIG. 1B, some of the broadband or video information providers (VIPs) equipment also may connect with the SS7 network to communicate CCIS interoffice signaling messages with the ISTP type controller and other control nodes of the network. In some cases, the VIP's equipment may itself have full SSP functionality.

In the illustration in FIG. 1A, many telephones 219', such as stations A, B and C, connect to end office SSP's 11 and 17, via standard existing telephone lines (or equivalents thereof). Subscribers to integrated communications services communicate to an end office, such as SSP-CO 17, via transport media and routing components capable of transporting voice telephone signals as well as data and broadband information. To a user of a telephone station connected to integrated service lines, however, the telephone functionality appears to be the same as plain old telephone service (POTS). In other words, to the user of telephone station D, the calling operations and quality of services appear identical to those available to a person using telephone station A. Exemplary techniques for providing telephone service to a station such as telephone station D are discussed in more detail below with regard to FIG. 1B.

The AIN topology illustrated in FIG. 1A is exemplary in nature, and other network topologies can be used. For example, the illustrated networks include SSP functionality in each of the end office telephone switching systems. In some networks, at least some of the end offices may not have SSP capabilities. Each such end office would connect to a trunk which in turn feeds calls to a tandem switching system with SSP capabilities. The SSP tandem communicates with the ISTP, as in the implementation described above. For the SSP capable end office switches that may be present in the network, they communicate through the SS7 network with the ISTP, in the same manner as in the embodiment of FIG. 1A. The SSP capable tandem office switch is a digital switch, such as the 5ESS switch from AT&T; and the non-SSP type end offices might be 1A analog type switches. Also, a switch point which is an SSP for one type of service, may not serve as an SSP for another type of service. For example, the HDT's 180 may be SSP's for data and broadband services, but not for telephone services. In such a case, the HDT's would route telephone calls through to one of the SSP telephone switches, either an end office or a tandem office.

The messages transmitted between the SSPs and between the SSPs and the ISTPs are all formatted in accord with the SS7 protocol. For AIN type processing, the application portion of SS7 utilizes Transaction Capabilities Applications Protocol (TCAP). For call set-up processing, e.g. to set up a telephone call between station A and station C, the application portion of SS7 utilizes ISDN User Part (ISDN-UP) protocol. These protocols are described in more detail below with regard to FIG. 5.

FIG. 1B shows the telephone portions of the network is less detail than FIG. 1A, but FIG. 1B illustrates the broadband distribution systems and associated control signaling network in greater detail. The integrated broadband network of the present invention will provide broadcast video distribution, archival video services and interactive multi-media services as well as a suite of narrowband services including plain old telephone service.

FIG. 1A includes a simplified illustration of a portion of the broadband distribution elements of the integrated network. Subscribers having broadband service would obtain all services through optical fiber connections to an HDT 180 and an ONU 210. A single drop may be used between the ONU 210 and the subscriber premises to carry voice, signaling and broadband information, and only a single connection is illustrated for simplicity. In the currently preferred embodiment, a coaxial cable carries the downstream broadband information and the two-way signaling information between the ONU 210 and the DET's 217 (only one shown) on the subscriber premises. A separate twisted wire pair carries telephone service signals (POTS or ISDN) between the ONU and the telephone station(s) D at the subscriber premises.

The HDT 180 communicates with the SSP type CO 17 for providing connected subscribers with telephone services. In this regard, the HDT, the ONU and the optical fibers effectively function as an optical type subscriber loop carrier system. The SSP-HDT may itself act as an end office or PBX type switch. Alternatively, the SSP-CO may route all telephone calls to the associated CO for further processing. The SSPs process outgoing telephone calls from telephone type equipment, such as station D, as well as incoming calls directed to that equipment in essentially the same manner as for calls to and from lines having only POTS type service, e.g. to standard telephone stations A and B.

To provide broadband video services, the HDT 180 receives asynchronous transfer mode (ATM) broadband signals from servers operated by interactive services providers through an ATM switch 410 and from other sources such as broadcast ATM sources or servers shown in more detail in FIG. 1B. In the present invention, the HDT has full SSP capabilities, essentially in the same manner as the SSP type CO's 11 and 17, discussed above. The HDT therefore also conducts signaling communications with the with other network components, particularly the ISTP 25 as discussed in more detail below, to provide subscriber requested broadband services through the DET 217 and the associated television set 217'.

Figure 10:
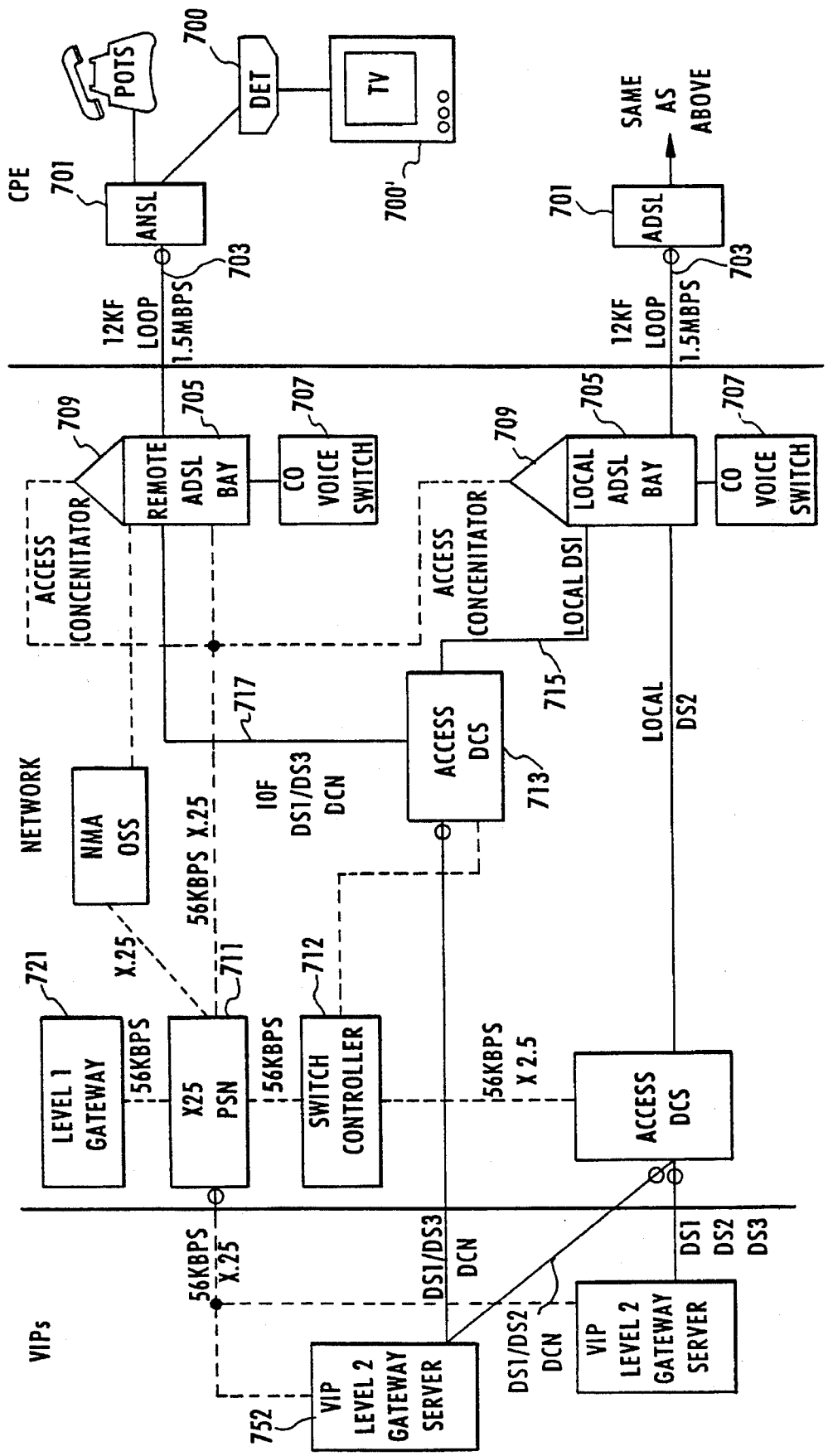
FIG. 10 illustrates an exemplary prior art configuration of a video dial tone network.

The invention could be practiced in a network using ADSL technology and/or digital cross connect switching similar to those features in the prior art network of FIG. 10 or in a hybrid fiber coax network using radio frequency transport of digitized, compressed video signals as in the 08/304,174 case noted earlier. The illustrated embodiment, however, utilizes an advanced fiber to the curb system with ATM (Asynchronous Transport Mode) transport, similar to one of networks disclosed in commonly assigned application Ser. No. 08/250,792, filed May 27, 1994, entitled "Full Service Network", the disclosure of which is incorporated herein entirely by reference. The invention could easily be adapted to control a variety of other types of video dial tone networks, including those disclosed in commonly assigned application Ser. No. 08/413,810 filed Mar. 28, 1995 entitled "Access Subnetwork Controller for Video Dial Tone Networks" and in commonly assigned application Ser. No. 08/498,265 filed Jul. 3, 1995 entitled "Downloading Operating System Software Through a Broadcast Channel", the disclosures of which also are incorporated herein entirely by reference.

As illustrated in FIG. 1B, the broadcast video services will initiate from a broadcast video source or server 101. The broadcast server 101 includes an actual analog video source 110. Although only one is shown, a typical broadcast service provider will have a plurality of such sources. The analog signal from the source is carried by any convenient means, such as an optical fiber, etc. Means (not shown) are provided as necessary to convert analog video transmission signals, e.g. NTSC broadcast signals, to baseband video and audio signals. The baseband signals are applied to a real time encoder 120.

The real time encoder 120 digitizes the audio and video signals and performs data compression. As currently envisaged, the encoder will encode the program signal into an MPEG II format although other digital compression encoding schemes may be used, such as DIGICIPHER™. MPEG (moving picture experts group) is a broad generic standard for video program compression, and MPEG II is a second generation compression standard for packetized transport of one or more compressed video program signals in a single stream. A number of specific compression algorithms will satisfy MPEG requirements. Typically, MPEG permits encoding of audio/video program materials into digitized, compressed format at rates in the range of 1.5 to 6 Mbits/sec.

The illustrated real time encoder 120 preferably is set up as a bank of encoders to process six sets of analog audio/video program signals in parallel. As such, the bank of encoders 110 produces six 6 Mbits/sec MPEG II bit streams, which are combined together with appropriate overhead information into a single 45 Mbits/sec DS-3 type signal. The DS-3 signal from the encoder 110 is input to an interworking unit (IWU) 130. The interworking unit 130 is the actual input point for the encoded broadcast video information into the network.

The exemplary network illustrated in FIG. 1B utilizes asynchronous transfer mode (ATM) switching to transport all video information, including the broadcast video information. ATM is a packet oriented time division multiplexing technique. In ATM, information is organized into cells having a fixed length and format. Each cell includes a header, primarily for identifying cells relating to the same virtual connection, and an information field or "payload". A 53 octet ATM cell includes a cell header consisting of 5 octets and a payload consisting of 48 octets of data. The ATM cell header information includes a virtual path identifier/virtual channel identifier (VPI/VCI) to identify the particular communication each cell relates to. For example, for broadcast signals, the VPI/VCI will identify a particular program channel. For a point to point transmission, e.g. for video on demand, the VPI/VCI in each header of the ATM cells would effectively identify a specific end point of the virtual communication link.

ATM transfer is asynchronous in the sense that the recurrence of cells that contain information from any particular sender is not necessarily periodic. Each device using the ATM network submits a cell for transfer when they have a cell to send, not when they have an assigned or available transmission time slot. ATM allows any arbitrary information transfer rate up to the maximum supported by the ATM network, simply by transmitting cells more often as more bandwidth is needed. In an initial implementation, all video materials will be transferred at a constant, standardized bit rate, however, preferred later generations of the network will utilize the ATM capabilities of the network to permit transmission of video information over channels of different bit rates, e.g. 1.5 Mbits/sec, 3 Mbits/sec, 6 Mbits/sec, etc. It will also be possible to vary the bit rate during communication on an as needed basis.

The interworking unit (IWU) 130 grooms the continuous MPEG II bit streams of the broadcast services for ATM cell stream transmission over optical fiber transport links. As such, the IWU 130 performs both ATM adaptation of the MPEG II programs into cells and ATM multiplexing of the resultant cells. Specifically, the interworking unit will divide the MPEG packets into appropriate length payloads and combine the payload data with appropriate cell headers, necessary for ATM transport. In an initial implementation, downstream links would carry an OC-12 bit rate, but higher rate transports such as OC-48 will be used in later implementations. Assuming use of OC-12, one such transport link will normally carry the equivalent of 12 DS-3s. However, conversion into ATM cell format with associated headers imposes added overhead requirements on the data transmissions. In the presently preferred embodiment, one interworking unit 130 therefore processes up to ten DS-3 signals to produce an ATM bit stream at the OC-12 rate.

A transport interface 140 converts the electrical signal from the interworking unit 130 into an optical signal and transmits the optical signal through fiber 150 to an adaptive digital multiplexer (ADM) identified in the drawing as a video bridging and insertion device 160. The ADM 160 performs three functions, passive bridging, active bridging and insertion of signals from other broadcast service providers (if any). The three functions may actually be separate, but in the preferred embodiment would be performed by elements collocated within the one network component ADM 160.

As noted above, the real time encoders 120 each output a single DS-3 signal comprising up to 6 MPEG II bit streams. The interworking unit 130 processes up to ten DS-3 signals to produce an ATM bit stream at the OC-12 rate. Consequently, one broadcast video source 101 may produce as many as 60 channels of CATV type broadcast programming for transport over one OC-12 type SONET optical fiber 150. Many providers, however, may not choose to broadcast so many channels. For example, the provider operating broadcast video source 100 may offer only 42 channels. Such an ATM channel transmission on the optical fiber 150 will not utilize the entire OC-12 channel capacity of that fiber. In the specific example, the 42 channels together require the equivalent of 7 of the available 10 DS-3s.

The illustrated architecture permits a second broadcast service provider to utilize the transport capacity not used by the first provider. The second broadcast service provider would offer additional channels from a separate second source 101'. The broadcast source type server 101' is essentially identical in structure and operation to the source server 101, but the source/server 101' will offer up to the number of channels necessary to fill the OC-12 transport capacity. In the example, if the source 101 transmits 42 channels (7 DS-3s) via the fiber 150, the second source 101' could transmit up to 18 additional channels (3 DS-3s). The function of the insertion device in the ADM 160 is to combine the signals from the two sources into a single OC-12 rate signal (10 DS-3s in ATM cell format) for further transmission through the optical network.

The two bridging functions facilitate dissemination of the broadcast material throughout the entire network. The passive bridging elements are optical splitters for splitting one OC-12 optical signal from the insertion device into a number of duplicates thereof, e.g. 1:2, 1:4, 1:8, etc. The active bridging elements convert an optical signal to an electrical signal, regenerate the electrical signal and convert the regenerated signal back to an optical signal for application to multiple output ports. The optical OC-12 output signals from the bridging components are transmitted over a large number of optical fibers 170 to host digital terminal type local routers throughout the network service area. One host data terminal (HDT) 180 is shown in FIG. 1B as a representative example.

When a subscriber requests a specific broadcast channel, the digital entertainment terminal (DET) in the subscriber's home provides a signal identifying the selected channel to the HDT 180. The signaling between the digital entertainment terminal (DET) and the HDT 180 and the real time control of the routing by the HDT 180 will be discussed in more detail below. For simplicity here, assume for the moment that the subscriber should receive the requested channel. Inside the HDT, the ATM cell stream from an optical fiber 170 is applied to an ATM switching system. To carry larger numbers of channels, there would be duplicate sources, insertion devices and bridging elements to transport the additional channels over fibers parallel to the illustrated fibers 170. Signals from one or more such additional parallel fibers would be applied to corresponding parallel inputs to the internal ATM switch. The control functionality of the HDT 180 and the interaction of the SSP-HDT 180 with the ISTP to achieve that control will be discussed in detail later.

One HDT 180 will communicate with a large number of optical network unit (ONU's) 210 via pairs of optical fibers 190. As currently envisaged, each home or living unit will have as many as four DETs 217. Each ONU 210 and the downstream fiber of the pair 190 to the ONU 210 will provide downstream video services to a number of homes, e.g. 8 to 24. The transmissions on the downstream fibers between the HDT and the ONU's 210 are synchronous, although the video information remains in ATM cell format. Each DET served by an ONU 210 is assigned a specified time slot on the downstream fiber of a pair 190.

The HDT 180 includes a component which is essentially a non-blocking type ATM switch (discussed in more detail below with regard to FIG. 4). In response to the selection signal from a DET 217, the HDT 180 accesses the appropriate input circuit interface unit and identifies each ATM cell from that fiber interface for which the header information indicates that the cell represents information for the selected broadcast channel. The identified ATM cells are bridged by the internal ATM switch to a line interface unit providing transmissions over the optical fiber 190 to the particular ONU 210 which services the requesting subscriber's premises. When the HDT selects each ATM cell for transmission to a specific DET, elements on the line interface card communicating with the particular ONU will buffer the cell as necessary and place the cell in the time slot for that DET on the downstream fiber of optical fiber pair 190. The cells selected for a particular DET, together with cells going to other DET's served by the same ONU are multiplexed into their respective time slots, applied to an electrical to optical converter and transmitted over the downstream fiber to the ONU 210 serving the particular subscriber's premises.

The basic purpose of the ONU 210 is to separate out the HDT side links into individual customer links and provide optical to electrical conversion for electrical delivery to the individual subscribers' premises. Although depicted as a single line in FIG. 1B, in the current implementation, the drop cable to each subscriber's premises comprises a coaxial cable for carrying the video and/or digital data signals and a twisted wire pair for carrying telephone signaling. Alternatively, ADSL communications over twisted wire pair could be used between the ONU and the subscribers premises. In the preferred embodiment, the ONU 210 includes means to convert optical signals received over the downstream fiber of the pair 190 to electrical signals and transmit signals from each DET's assigned time slot down over the coaxial cable to the subscriber's premises. The ONU 210 provides two-way conversion between optical and electrical and between digital and analog signals for voice telephone service over the twisted wire pairs. The ONU's also provide two-way conversion between optical and electrical and multiplexing and demultiplexing for the signaling channels to/from the DETs 217.

More specifically, the DET 217 responds to user inputs on the built in keypad or the remote control by transmitting appropriate data signals over a narrowband channel on the coaxial drop cable to the ONU 210. Each ONU 210 multiplexes the user input data signals from the DETs 217 that it services together and transmits those signals to the SSP-HDT 180 over an upstream fiber of the optical fiber pair 190. If related to processing of a broadband call, e.g. selection of a channel or an interactive broadband service VIP, the SSP-HDT 180 processes those signals and may interact with one of the ISTPs 25, as discussed in more detail below, to determine how to route the broadband service call. In the preferred embodiment, the SSP-HDT 180 will respond similarly to signals from a DET 217 relating to packet data calls and preferably processes voice calls in a similar manner.

Once an interactive call is routed through to its broadband or packet data call destination, the HDT 180 transmits the upstream control signals to control elements at the respective destination. For example, for an interactive broadband service such as video on demand, the VIP would operate a control element identified as a level 2 gateway, of essentially the same type as the level 2 gateway in the prior art system of FIG. 6. In an initial implementation, the HDT's 180 communicate with the level 2 gateways through an X.25 type data call through the packet switched data communication portion of the integrated network. This packet data call operates in parallel to the broadband link between the VIPs broadband file server 253 and the DET 217. For VIPs connected to the ATM switch 410, future implementations will use ATM communications through that switch for the two-way signaling communication between the level 2 gateway and the DET 217. For an established packet data call, e.g. to the packet data device 218 (FIG. 1A) the HDT 180 simply forwards upstream data to the next higher packet data node in the network, typically the CO 17, for further transport to the other party to the call. Similarly, the HDT would route downstream packet data received from the higher level packet node through the signaling channel to the calling subscriber's DET.

The network of FIG. 1B also includes a billing system 15 operated by the TELCO. The billing system communicates with all of the SSP's, either through the CCIS network and ISTP's or through a separate parallel data communication link. Whenever a complete communication link is set up, between telephone stations, between a DET 217 and a packet data device 218, between an interactive broadband service VIP 250 and a DET 217 or to supply a broadcast service to a DET 217, one or more of the SSPs formulates an appropriate message for the billing system 15. The message identifies the subscriber, the type of communication (e.g. to a broadband VIP or selection of the particular channel) the other party to the communication (e.g. the called party or the broadcast VIP) and the start time. The same SSP formulates a similar message to the billing system 15 when the communication ends and the communication link is torn down. These messages may be transmitted to the billing system on a real-time basis, as events occur, or the SSPs may store the various billing data and periodically upload the messages to the billing system 15.

A power source 211 supplies −130 V dc and battery reserve power, for at least telephone service, to the ONU's 210. The power source 211 may connect to the ONU's via twisted pairs, but in the preferred embodiment, the power is carried over a coax distribution cable.

At the subscriber premises, a network interface module or 'NIM' (not shown) within the set-top device or digital entertainment terminal (DET) 217 couples DET 217 to the coaxial drop cable of the distribution network. In this network configuration, the NIM includes appropriate means to select ATM cells from its assigned time slot on the coaxial cable and strip off the ATM header information and reconstitute the digital payload data, e.g. into MPEG packetized information. The NIM also provides two way signaling for transmission of narrowband data through the network, typically for control signaling purposes.

In the illustrated network, the DET 217 also includes a CPU comprising a 386 or 486 microprocessor with associated memory (RAM, ROM and EPROM), as well as an audio/video decoder controlled by the CPU. The audio/video decoder decompresses the digitized broadband information. The preferred embodiment of the audio/video decoder comprises an MPEG video decoder, an MPEG audio decoder, and an MPEG demultiplexer for selectively routing MPEG encoded video and audio packets carried on the digital broadband channel to the MPEG video decoder and the MPEG audio decoder, respectively. The MPEG demultiplexer routes data packets from the MPEG stream to the CPU for further processing, e.g. as downloaded data and/or control programming or as graphic/text information. The DET 217 also includes a graphics display generator for generating displays of received graphics and text data output by the CPU, such as the initial turn-on selection menu, discussed in more detail below. The DET 217 also includes digital to analog converters and appropriate drivers to produce output signals compatible with a conventional television set 217' from the decoded audio/video information and the graphics display. Each DET also includes means to receive selection signals from a user and transmit appropriate data signals over a narrowband signaling channel through the network.

Although simpler set top terminals may be used, the presently preferred digital entertainment terminal (DET) 217 is a programmable device to which different applications programs will be downloaded from an information provider's level 2 gateway device, in order to permit the DET to interact with different information service providers and thereby offer the user totally different types of services. At least one VIP, typically a vendor of the DET 217, also can download portions of the operating system. The DET 217 will permanently store only an operating system and a loader program, to control initial communications with the SSP-HDT 180. Based on this loader routine, the DET 217 will normally wake up in a CATV-like mode of operation for selecting and receiving broadcast programs. For example, the DET 217 will normally store an identification of the last broadcast channel viewed, in non-volatile memory, and will retain that identification in memory while the DET is off. When the user turns the DET 217 back on, the DET will transmit a request for the last viewed channel to the SSP-HDT 180, to obtain that channel for display in the usual manner. The DET 217 will also offer the video information user (VIU) the option to select initiation of a call to an interactive service provider through the ATM switch and or through the packet data switching function of the CO's.

The structure and operation of the DET 217, outlined above, are described in more detail in commonly assigned application Ser. No. 08/250,791, filed May 27, 1994, entitled "Dynamically Programmable Digital Entertainment Terminal" (attorney docket no. 680-083), the disclosure of which is entirely incorporated herein by reference.

2. SSPs

Figure 2:
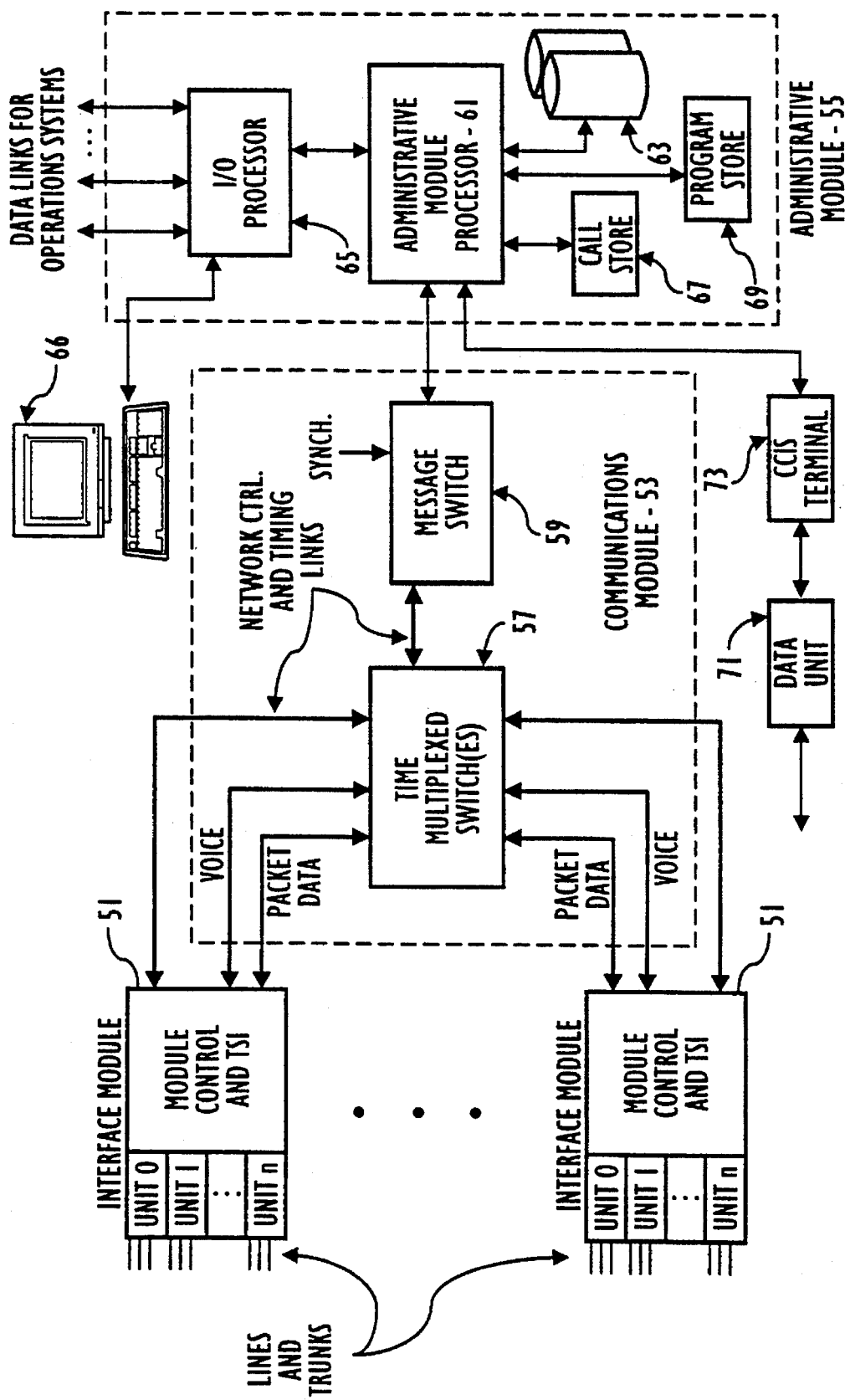
FIG. 2 is a more detailed diagram of an SSP type central office (CO) used in the preferred intelligent network implementation of the present invention to provide switched or selective communications links for voice and/or packet data services and associated signaling.

FIG. 2 is a simplified block diagram of an electronic program controlled switch which may be used as any one of the SSP type CO's in the system of FIG. 1A and 1B. As illustrated, the CO switch 11 or 17 includes a number of different types of modules. In particular, the illustrated switch includes interface modules 51 (only two of which are shown), a communications module 53 and an administrative module 55. The SSP-CO provides switched voice grade telephone services and packet switched data services (X.25 and/or ISDN).

The interface modules 51 each include a number of interface units 0 to n. The interface units terminate lines from subscribers' stations, trunks, T1 carrier facilities, etc. Where the interfaced circuit is analog, for example a standard subscriber telephone loop to station 219' (FIG. 1A), the interface unit will provide analog to digital conversion and digital to analog conversion. Alternatively, the lines or trunks may use digital protocols such as T1 or ISDN, e.g. to provide transport to various combinations of voice and packet data equipment. The trunk circuit to one of the HDT's 180 will take the form of a pair of optical fibers providing two-way transport for a number of multiplexed DS-1 type signals. Each DS-1 comprises 24 slots, each slot providing transport for a 64 kbits/s DS-0 slot. Each DS-0 slot (equivalent to an ISDN B-channel) can transport digitized voice or packets of data, e.g. in X.25 format. Each interface module 51 also includes a digital service unit (not shown) which is used to generate call progress tones.

Each interface module 51 includes, in addition to the noted interface units, a duplex microprocessor based module controller and a duplex time slot interchange, referred to as a TSI in the drawing. Digital words representative of voice information or packet data information are transferred in two directions between interface units via the time slot interchange (intramodule call connections) or transmitted in two directions through the network control and timing links to the time multiplexed switch 57 and thence to another interface module (intermodule call connection).

The time multiplexed switch 57 may consist of a single switch fabric capable of time division multiplexed routing of packets representing both voice and data. Alternatively, the switch 57 may comprise separate switch modules for time division multiplexed routing of the voice words and the data packets.

The communication module 53 includes the time multiplexed switch 57 and a message switch 59. The time multiplexed switch 57 provides time division transfer of digital voice data packets between voice channels of the interface modules 51 and transfers data messages between the interface modules. The message switch 59 interfaces the administrative module 55 to the time multiplexed switch 57, so as to provide a route through the time multiplexed switch permitting two-way transfer of control related messages between the interface modules 51 and the administrative module 55. In addition, the message switch 59 terminates special data links, for example a link for receiving a synchronization carrier used to maintain digital synchronism.

The administrative module 55 includes an administrative module processor 61, which is a computer equipped with disc storage 63, for overall control of CO operations. The administrative module processor 61 communicates with the interface modules 51 through the communication module 53. The administrative module 55 also includes one or more input/output (I/O) processors 65 providing interfaces to terminal devices for technicians such as shown at 66 in the drawing and data links to operations systems for traffic, billing, maintenance data, etc. A CCIS terminal 73 and an associated data unit 71 provide a signalling link between the administrative module processor 61 and an SS7 network connection to an ISTP, an STP or the like (see e.g. FIG. 1A), for facilitating call processing signal communications with other CO's, with HDT's 180 and with the ISTPs 25. The CCIS terminal 73 and data unit or an additional terminal and data unit (not shown) provide communications between the administrative module of the CO and an appropriate billing system 15 (see FIG. 1B).

As illustrated in FIG. 2, the administrative module 55 also includes a call store 67 and a program store 69. Although shown as separate elements for convenience, these are typically implemented as memory elements within the computer serving as the administrative module processor 61. For each call in progress, the call store 67 stores translation information retrieved from disc storage 63 together with routing information and any temporary information needed for processing the call. For example, for a switch based Centrex type service, the call store 67 would receive and store extension number translation information for the business customer corresponding to an off-hook line initiating a call. For a call by or to a subscriber of an AIN based telephone service, the call store 69 would receive and store information defining various trigger events to look for during processing of the call. The program store 69 stores program instructions which direct operations of the computer serving as the administrative module processor.

Figure 3:
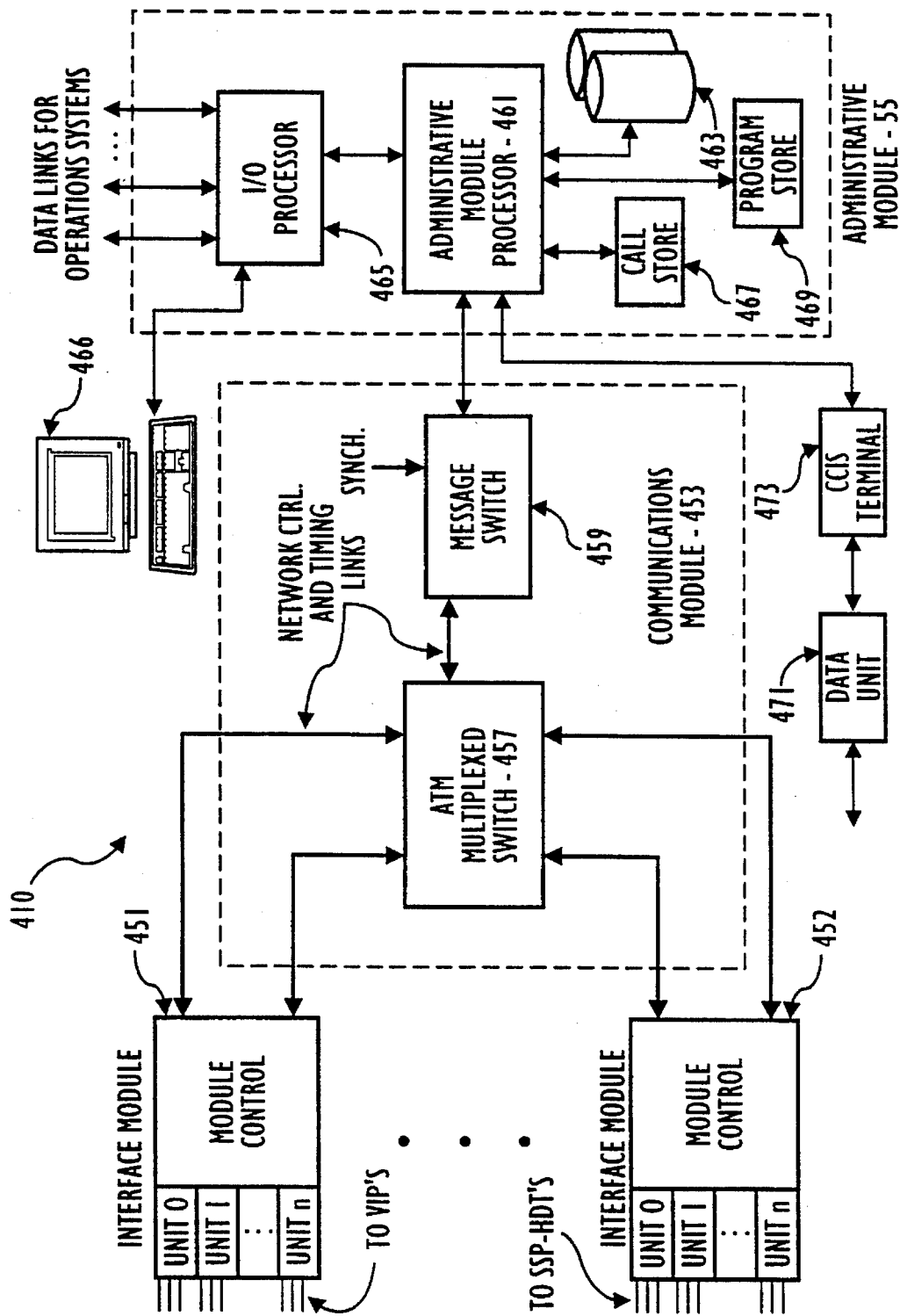
FIG. 3 is a more detailed diagram of an SSP type Asynchronous Transfer Mode (ATM) switching system used in the preferred intelligent network implementation of the present invention to provide switched or selective communications links for broadband (video) and/or packet data services.

FIG. 3 is a simplified block diagram of an ATM type electronic program controlled switch which may be used as the switch 410 in the system of FIGS. 1A and 1B. The organization of the SSP type ATM switch of FIG. 3 is substantially similar to that of the SSP-CO shown in FIG. 2, although a variety of other switch architectures may be used. As illustrated in FIG. 3, the ATM switch includes interface modules 451, 452 (only two of which are shown), a communications module 453 and an administrative module 455.

The interface module 451 terminates lines from VIP equipment. The interface module 451 includes a number of interface units 0 to n. As discussed in more detail below, these line interface units receive ATM cell streams representing broadband information from the VIP equipment and may provide a two-way connection to the VIP equipment for signaling information and/or data communications in ATM cell format.

The interface module 452 terminates optical fiber trunks going to the SSP-HDT's 180. The interface module 452 includes a number of trunk interface units 0 to n. These trunk interface units transmit ATM cell streams representing broadband information to the SSP-HDT's 180 and may provide a two-way connection to the to SSP-HDT's for signaling information and/or data communications in ATM cell format.

ATM cells are transferred in two directions through the network control and timing links to the ATM multiplexed switch 457 and thence to another interface module in a manner similar to an intermodule call connection in the CO-SSP of FIG. 2. More specifically, in the ATM switch of FIG. 3, ATM cells from a VIP (broadband, data and signaling) are transferred from the appropriate line interface unit in module 451 through the ATM multiplexed switch 457 to a trunk interface unit in module 452 servicing the appropriate SSP-HDT. Similarly, ATM cells from an SSP-HDT (data and signaling) are transferred from the appropriate trunk interface unit in module 452 through the ATM multiplexed switch 457 to a line interface unit in module 451 servicing the particular VIP. Although labeled and described as a "switch," the module 457 may in fact utilize a variety of fabrics to achieve the necessary routing of cells between interface modules and the attendant cell policing.

The communication module 453 includes the ATM multiplexed switch 457 and a message switch 459. The ATM multiplexed switch 457 provides the actual ATM transfer of cells between channels of the interface modules 451, 452 and transfers control data messages between the interface modules. The message switch 459 interfaces the administrative module 455 to the ATM multiplexed switch 457, so as to provide a route through the ATM multiplexed switch permitting two-way transfer of control related messages between the interface modules 451, 452 and the administrative module 455. In addition, the message switch 459 terminates special data links, for example a link for receiving a synchronization carrier used to maintain digital synchronism.

The administrative module 455 includes an administrative module processor 461, which is a computer equipped with disc storage 463, for overall control of operations of the SSP type ATM switching system. The administrative module processor 461 communicates with the interface modules 451 through the communication module 455. The administrative module 455 also includes one or more input/output (I/O) processors 465 providing interfaces to terminal devices for technicians such as shown at 466 in the drawing and data links to operations systems for traffic, billing, maintenance data, etc. A CCIS terminal 473 and an associated data unit 471 provide a signalling link between the administrative module processor 461 and an SS7 network connection to an ISTP, an STP or the like (see FIG. 1A), for facilitating call processing signal communications with the CO's, the HDT's and the ISTPs 25. The CCIS terminal 473 and data unit 471 or an additional terminal and data unit (not shown) provide communications between the administrative module 455 and the billing system 15 (FIG. 1B).

As illustrated in FIG. 3, the administrative module 455 also includes a call store 467 and a program store 469. Although shown as separate elements for convenience, these are typically implemented as memory elements within the computer serving as the administrative module processor 461. The disc memory 463 stores data tables defining all possible virtual circuits through the ATM switch and the HDT's to each terminal of a customer subscribing to a particular provider's services. These data tables define the header information (e.g. VPI/VCI) and the particular fiber output port used to route cells to the correct HDT 180. These data tables thus define "permanent virtual circuits" ("PVC's") between the providers 250 and the DET's 217. In implementations where the ATM switch 410 also provides two-way transport of signaling data between the VIPs level 2 gateways 251 and the HDT's 180, the disc memory 463 would store similar PVC data tables for the signaling links. The program store 469 stores program instructions which direct operations of the computer serving as the administrative module processor. For each call in progress, the call store 467 stores translation information retrieved from disc storage 463 together with routing information and any temporary information needed for processing the call. Consider for example an interactive session between a subscriber and a VIP using ATM signaling, as in the preferred future implementation. In such a case, the call store 467 would receive and store the VPI/VCI designations necessary for routing the downstream broadband information, and the two-way signaling information, from the VIPs equipment through currently available ATM virtual circuits and the HDT and ONU to the subscriber's terminal (DET) from the PVC table in the disc storage system 463.

Figure 4:
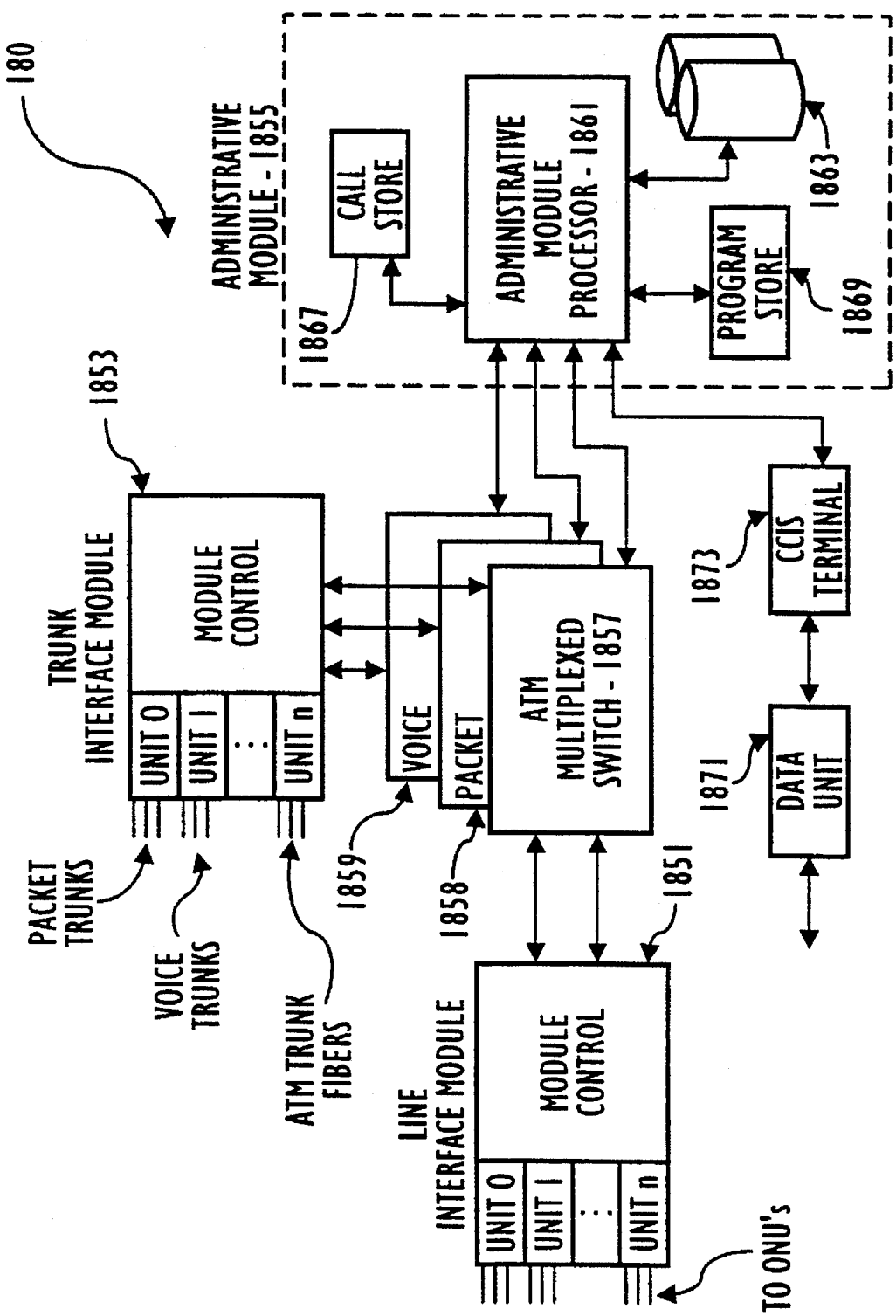
FIG. 4 is a more detailed diagram of an SSP type local router, in this case a Host Digital Terminal (HDT), used in the preferred intelligent network implementation of the present invention.

FIG. 4 is a simplified block diagram of an electronic program controlled switch which may be used as any one of the SSP-HDT's 180 in the system of FIGS. 1A and 1B. As illustrated, the SSP-HDT includes one or more line interface modules 1851, one or more trunk interface modules 1853, a series of actual switch modules, and an administrative module 1855.

The line interface module 1851 includes a number of interface units 0 to n. These interface units terminate optical fibers providing two-way communications through the ONU's to and from the actual subscribers' stations. Part of the function of the interface units is to provide two-way conversion between electrical signals and optical signals. The line interface units also place the broadband ATM cells, the voice telephone information, packet data information and/or signaling data in appropriate channels going to the ONU. In the opposite communication direction, the line interface units supply upstream voice telephone information, and packet and/or signaling data from the subscriber's channels on the fibers from the ONU's to appropriate switches 1858, 1859 within the HDT.

The trunk interface module 1853 includes a number of trunk interface units 0 to n. These interface units terminate a variety of packet data, voice and ATM trunk circuits. More specifically, certain of the interface units terminate optical fiber trunks carrying broadcast video service information, in ATM cell stream form, to the HDT 180. Other interface units terminate ATM cell stream fiber trunks which carry broadband information from the ATM switch 410. In the future, these interface units will also provide a termination for two-way ATM cell streams providing signaling and data communication through the ATM switch 410. The voice trunk interface units terminate standard voice trunks coupled to one of the telephone type CO's, for example SSP-CO 17 shown in FIG. 1A.

The packet data trunk interface units terminate packet data trunk circuits coupled to a packet data switch, however, in the preferred implementation, the packet data switching is performed within one of the telephone type CO's, again for example the SSP-CO 17 shown in FIG. 1A. Although shown as separate trunk circuits in FIG. 4, the packet data and digitized voice may actually ride in different channels multiplexed onto a common trunk medium between the HDT and the CO as discussed above relative to FIG. 1B. Specifically, the trunk circuit between the HDT 180 and the CO preferably will take the form of a pair of optical fibers providing two-way transport for a number of multiplexed DS-1 type signals. Each DS-1 comprises 24 slots, each slot providing transport for a 64 kbits/s DS-0 slot. Each DS-0 slot (equivalent to an ISDN B-channel) can transport digitized voice or packets of data, e.g. in X.25 format.

Where the actual media of the trunks is optical, the interface units provide conversions between optical and electrical. The trunk interface units also receive the broadband ATM cells, downstream voice telephone information, and packet data information and/or signaling data in appropriate channels from the respective trunks and supply that information going to the appropriate one of the switches 1857, 1858, 1859 within the HDT. In the opposite communication direction, the trunk interface units supply upstream voice telephone information, and packet data from the subscribers to the appropriate trunks going to the associated CO. For upstream signaling intended for one of the VIPs, the ATM switch 1857 supplies that data in ATM cell stream format through the module control to the appropriate ATM trunk interface providing upstream transmission through an optical fiber to the ATM switch 410.

Each interface module 1851, 1852 includes, in addition to the noted interface units, a duplex microprocessor based module controller. Digital words representative of voice information, packets of data and ATM cells transmitted in two directions through network control and timing links to the time multiplexed voice switch 1859, the packet data switch 1858 and the ATM multiplexed switch 1857 and thence to the other type of interface module in a manner similar to an intermodule call connection in the telephone CO of FIG. 2.

Although labeled and referred to as a 'switch,' the ATM switch 1857 may comprise any routing device capable of receiving from and supplying cells to the interface modules and policing the cells. For example, module 1857 may consist of a token ring carrying ATM cells, and the nodes of the ring would process and police the cells as necessary to achieve the desired routing between interface modules. The packet switch 1858 would typically be a small capacity X.25 or ISDN compatible time division switch. The voice switch 1859 would be a small capacity digital voice switch, similar to the switch module of a digital PBX. Alternatively, a single digital switch may perform the routing functions of both the packet switch 1858 and the voice switch 1859.

The administrative module 1855 includes an administrative module processor 1861, which is a computer equipped with disc storage 1863, for overall control of the HDT operations. The disc storage 1863 stores translation tables to permit routing of voice, data and broadband information to customer premises devices. The disc system 1863 also stores subscriber profile information and may store channel mapping tables, as discussed in more detail below. The administrative module processor 1861 communicates with and controls the interface modules 1851, 1852 and the switches 1857, 1858, 1859. A CCIS terminal 1873 and an associated data unit 1871 provide a signalling link between the administrative module processor 1861 and an SS7 network connection to an ISTP, an STP or the like (see FIG. 1A), for facilitating call processing signal communications with the CO's, the ATM switch and the ISTPs 25. The CCIS terminal 1873 and the data unit 1871 or an additional terminal and data unit (not shown) provide communications between the administrative module 1855 and the billing system 15 (FIG. 1B).

As illustrated in FIG. 4, the administrative module 1855 also includes a call store 1867 and a program store 1869. Although shown as separate elements for convenience, the call store and the program store are typically implemented as memory elements within the computer serving as the administrative module processor 1861. For each broadband, packet data or voice call in progress, the call store 1867 stores translation information retrieved from disc storage 1863 together with routing information and any temporary information needed for processing the call. For example, for a broadcast video service, the call store 1867 would receive and store channel mapping information indicating the trunk fiber and the ATM virtual circuit on the trunk fiber for each broadcast service and information identifying the broadband channel in the fiber pair 190 assigned to the DET from which the channel request originated. The program store 1869 stores program instructions which direct operations of the computer serving as the administrative module processor.

3. Overview of SS7

To understand the message routing and processing of the present invention, particularly in the preferred embodiment, it will be helpful to review the SS7 protocol.

Figure 5:
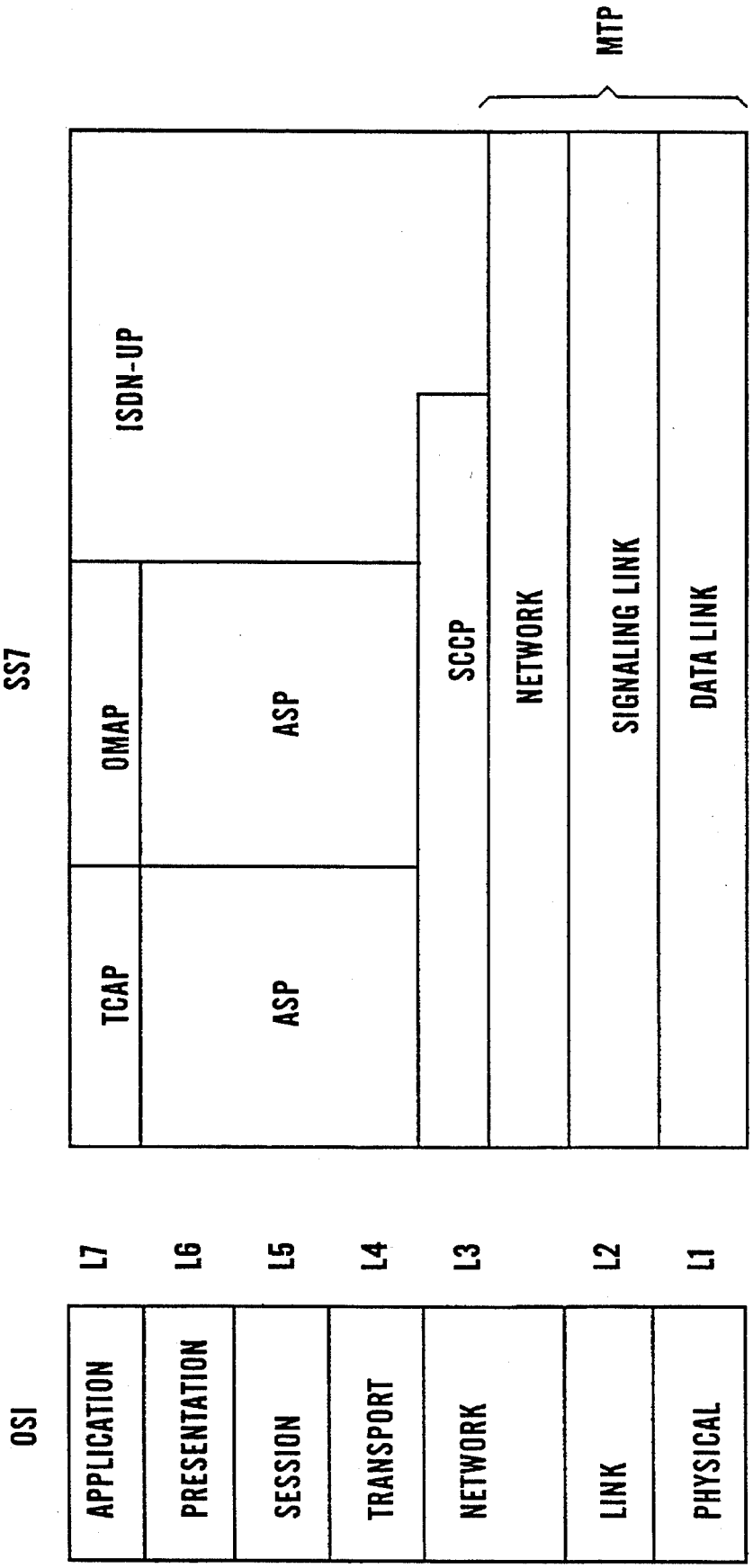
FIG. 5 depicts the protocol stack for SS7 and comparison thereof to the OSI model.

The International Standards Organization (ISO) Open Systems Interconnection (OSI) reference model specifies a hierarchy of protocol layers and defines the function of each layer in the network. FIG. 5 shows the OSI model and the relationship thereof to the protocol stack for SS7. The lowest layer defined by the OSI model is the physical layer (L1). This layer provides transmission of raw data bits over the physical communication channel through the particular network. The layer next to the physical layer is the data link layer (L2). The data link layer transforms the physical layer, which interfaces directly with the channel medium, into a communication link that appears error-free to the next layer above, known as the network layer (L3). The data link layer performs such functions as structuring data into packets or frames, and attaching control information to the packets or frames, such as checksums for error detection, and packet numbers. The network layer provides capabilities required to control connections between end systems through the network, e.g. set-up and tear-down of connections.

In the OSI model, a transport layer protocol (L4) runs above the network layer. The transport layer provides control of data transfer between end systems. Above the transport layer, a session layer (L5) is responsible for establishing and managing communication between presentation entities. For example, the session layer determines which entity communicates at a given time and establishes any necessary synchronization between the entities.

Above the session layer, a presentation layer (L6) serves to represent information transferred between applications in a manner that preserves its meaning (semantics) while resolving differences in the actual representation (syntax). A protocol (L7) that is specific to the actual application that utilizes the information communicated runs at the top of the protocol stack.

A detailed explanation of the SS7 protocol may be found in Bell Communications Research, "Specification of Signaling System Number 7," Generic Requirements, GR-246-CORE, Issue 1, December 1994, the disclosure of which is incorporated herein in its entirety by reference. A summary description of the most relevant aspects of SS7 appears below.

For SS7, typical applications layer protocols include Transaction Capability Application Part (TCAP); Operations, Maintenance, Application Part (OMAP); and ISDN User Part (ISDN-UP). TCAP provides the signaling protocols for exchange of non-circuit related, transaction-based information, typically for accessing databases such as SCPs. For example, TCAP specifies the format and content of an initial query message from an SSP to an SCP and various response messages from the SCP back to the SSP. As discussed more below, TCAP messages are also used for certain trigger responsive communications between the SSPs and the ISTPs. ISDN-UP is the actual call control application protocol of SS7. ISDN-UP specifies the procedures for setting up and tearing down trunk connections utilizing CCIS signaling. ISDN-UP messages, for example, include an Initial Address Message (IAM) type query, and Address Complete Message (ACM) and Answer Message (ANM) type response messages.

SS7 specifies an Application Service Part (ASP) for performing the functions of the presentation, session and transport layers for the TCAP and OMAP protocols. The lower four layers of the SS7 protocol correspond to the lower three layers (network, link and physical) of the OSI model. The lower three layers of the SS7 protocol, the network layer, the signaling link layer and the data link layer, form the Message Transfer Part (MTP) of SS7. The MTP is common to messages for all applications and provides reliable transfer of signaling messages between network nodes. The MTP relays messages between applications running at different nodes of the network, effectively like a datagram type service.

The SS7 network layer (lower portion of L3) routes messages from source to destination. Routing tables for the signaling network layer facilitate routing based on logical addresses. The routing functionality at this layer is independent of the characteristics of particular links.

The signaling link layer (L2) performs flow control, error correction and packet sequence control. The signaling data link layer (L1) is the actual physical connection between nodes of the CCIS network. The signaling data link layer in CCIS provides full duplex packet switched data communications. The signaling data link layer element provides a bearer for the actual signaling message transmissions. In a digital environment, 56 or 64 Kbits/s digital paths carry the signaling messages between nodes, although higher speeds may be used.

At the equivalent of the OSI network layer (L3), the SS7 protocol stack includes a Signaling Connection Control Part (SCCP) as well as the network layer portion of the MTP. SCCP provides communication between signaling nodes by adding circuit and routing information to SS7 messages. The SCCP routing information serves to route messages to and from specific applications. Each node of the signaling network, including the various switching offices, transfer points and databases in each network, is assigned a 9-digit pointcode for purposes of addressing signaling messages through the CCIS network. Both the SCCP protocol and the MTP processing utilize these point codes. It will be helpful to consider the format of SS7 messages and particularly the routing information contained in each message.

Figures 6, 7:
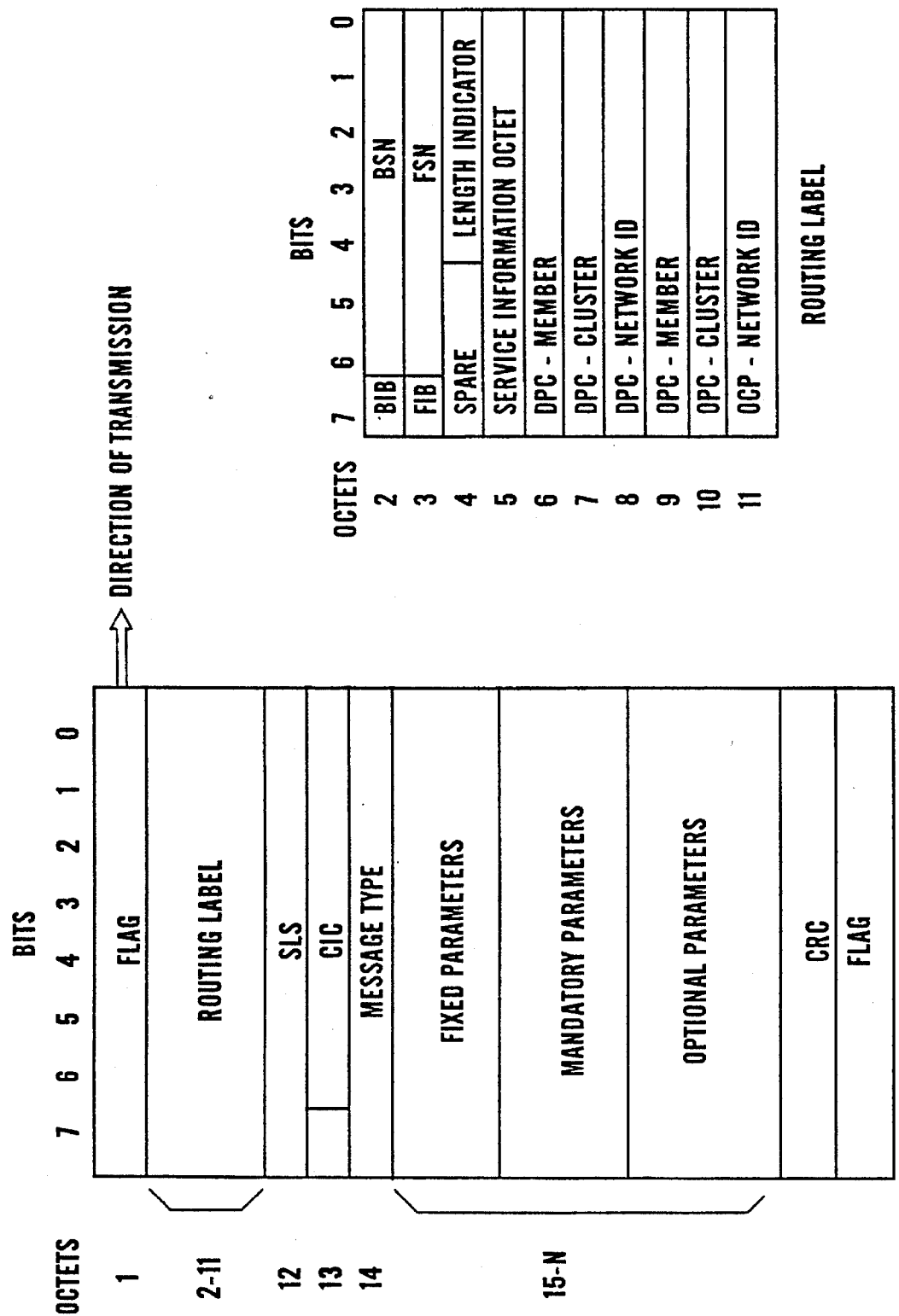
FIG. 6 illustrates in graphic form the layout of an SS7 protocol message packet.
FIG. 7 illustrates in graphic form the layout of the routing label portion of the SS7 protocol message packet shown in FIG. 6.

The SS7 messages traverse the network at all times. The messages themselves comprise digital serial messages that come into the ISTP. FIG. 6 provides a graphic illustration of an SS7 message packet. The first byte or octet of the message is a flag, which is a zero followed by 6 ones and another 0. This constitutes a unique bit pattern in the SS7 protocol. The protocol ensures that this particular pattern is not repeated until the next message. This provides a flag at the beginning of a new message. A flag at the end of a message is also provided usually in the form of the flag at the beginning of the next message, i.e., a message usually contains only one flag. The message is arranged in 8 bit bytes or octets. These octets represent the information carried by the message. The message contains both fixed and variable parameters. The Message Transport Part (MTP) of the SS7 message is always in the same place. The values change but the MTP is always in the same place.

Octets 2–11 form a routing label as discussed later with regard to FIG. 7. Octet 12 contains a signaling link selection (SLS) byte used to select specific links and/or determine the extent to which the network can select specific links to achieve load sharing. Octet 13 contains a Customer Identification Code (CIC) which typically is used to select an interexchange carrier. Octet 14 contains a message type indicator, and octets 15–N contain the actual message, in the form of fixed parameters, mandatory parameters and optional parameters. The length of the mandatory parameters field and the optional parameters field are variable. There would be 16 other bits that have Cyclic Redundancy Codes (CRCs) in them and another flag which would constitute the end of the SS7 message (and typically the start of the next message). CRCs constitute a further error detection code which is a level 1 function in the protocol.

FIG. 7 is a graphic illustration of the routing label of the SS7 message packet. The first 7 bits of octet 2 constitute the Backward Sequence Number (BSN). The eighth bit is the Backward Indicator Bit (BIB) which is used to track whether messages have been received correctly. The length of an SS7 message is variable, therefore octet 4 contains a message length indicator.

Octet 5 is the Service Information Octet (SIO). This indicates whether it is a Fill In Signal Unit (FISU), Link Service Signaling Unit (LSSU) or Message Signaling Unit (MSU). MSUs are the only ones used for setting up calls, LSSUs are used for alignment, and FISUs are fill in signals. The MSU indicator type SIO octet is formatted and encoded to serve as an address indicator, as discussed below.

The routing label includes fields for both destination related addressing and point of origin addressing. The destination or 'called party' address includes octets 6, 7 and 8. Octets 9–11 carry origination point code (OPC) information, for example member, cluster and network ID information.

In the example shown in FIG. 7, the three octets of the called party address contain an actual destination point code (DPC) identified as DPC-member, DPC-cluster and DPC-network ID information. In operation, the translation tables stored in a transfer point such as the ISTP cause the transfer point to actually route based on the DPC without translating any of the DPC octets into new values. The called party address octets (6–8), however, may carry other types of called party addressing information and receive different treatment by the ISTP. For example, these octets may carry a global title (GTT) and subsystem number (SSN) information. A transfer point utilizes a stored translation table to translate the GTT and SSN into an actual DPC, substitutes that DPC for the information in octets 6, 7 and 8, and then routes the message based on the DPC. As discussed more fully below, under certain circumstances, the ISTP will process application layer information from the SS7 message to determine whether to route or respond to the message. If the ISTP routes the message, the ISTP uses the actual DPC.

To distinguish the types of information carried in octets 6–8, the MSU type service information octet (5) contains an address indicator. For example, a '1' value in the first bit position in this octet signifies that the called party address octets contain a subsystem number, a '1' value in the second bit position in this octet signifies that the called party address octets contain a signaling point code. The third, fourth, fifth and sixth bits of the address indicator serve as the global title indicator and are encoded to identify the presence and type of global title value in octets 6–8.

4. ISTP

Figure 8:
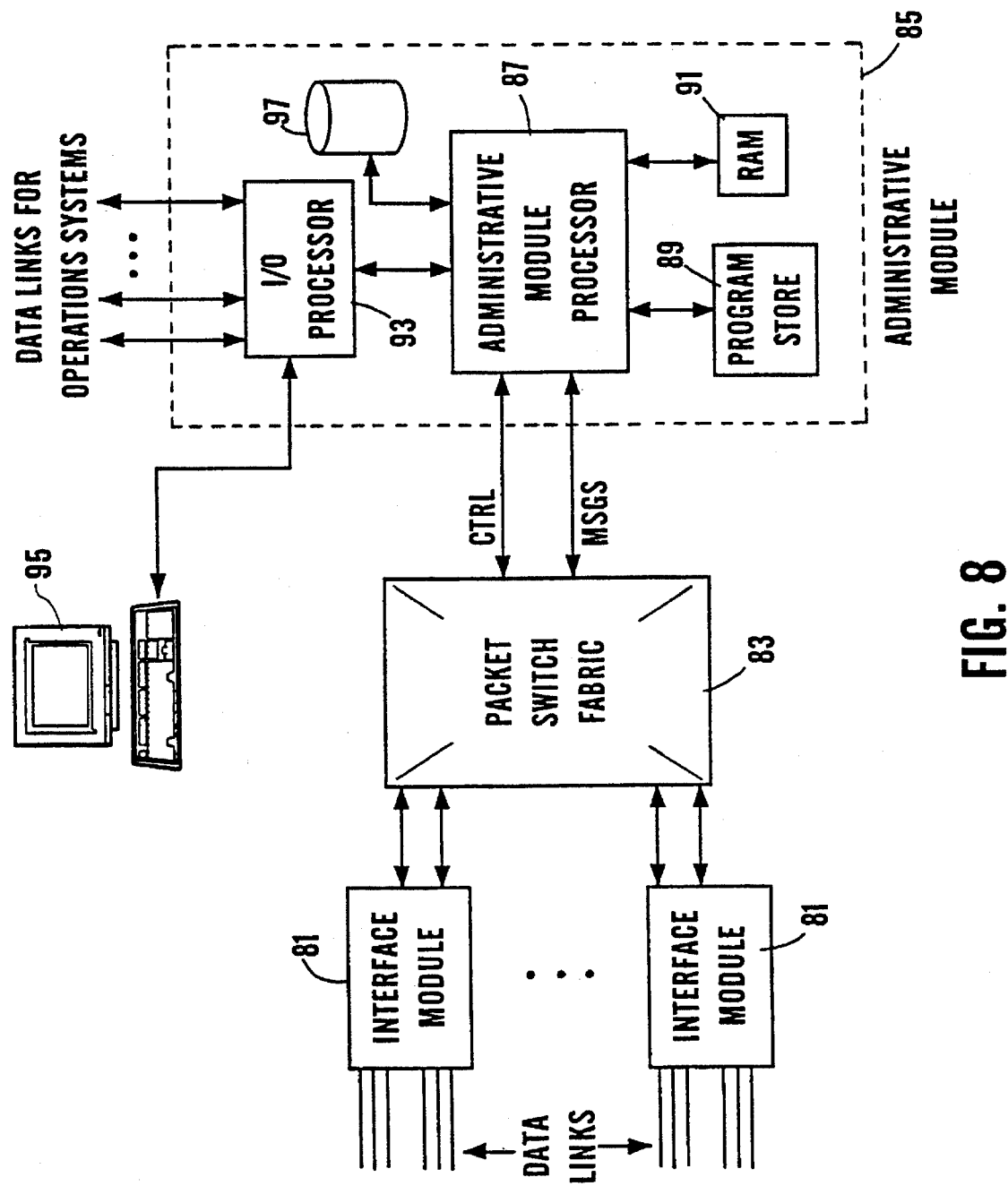
FIG. 8 is a functional block diagram of an Intelligent Signaling Transfer Point (ISTP) in accord with the present invention.

FIG. 8 depicts the functional elements of an ISTP, such as an ISTP 25 shown in the network of FIG. 1A or FIG. 1B. As shown, the ISTP comprises interface modules 81, a packet switch fabric 83 and an administrative module 85. The interface modules 81 provide the physical connections to the two-way data links to the switching systems, SCPs, ISCPs and other ISTPs. Typically, these links provide two-way 56 kbits/s or 64 kbits/s virtual circuits between nodes of the CCIS signaling network. The modules 81 provide a two-way coupling of SS7 data packets, of the type shown in FIG. 6, between the actual data links and the packet switch fabric 83. The packet switch fabric 83 provides the actual routing of packets coming in from one link, through one of the interface modules 81 back out through one of the interface modules 81 to another data link. The packet switch fabric 83 also switches some incoming messages through to the administrative module 85 and switches some messages from the administrative module 85 out through one of the interface modules 81 to one of the data links, for example to trigger access to an internal database and formulate and send back an appropriate call control response message.

The administrative module 85 includes an administrative module processor 87, which is a computer equipped with RAM 91 and a program store 89, for overall control of operations of the switching office. Although shown as a logically separate element, the program store 89 typically is implemented as memory within the computer serving as the administrative module processor 87. The administrative module processor 89 provides control instructions to and receives status information from the operation control element (not shown) within the packet switch fabric 83. The administrative module processor 87 also transmits and receives some messages via the packet switch fabric 83 and the interface modules 81. The administrative module 85 also includes one or more input/output (I/O) processors 93 providing interfaces to terminal devices for technicians such as shown at 95 in the drawing and data links to operations systems for traffic recording, maintenance data, etc.

In accord with the present invention, the administrative module 85 also includes a database 97 storing call processing records (CPRs). The database 97 may be a Multi-Services Application Platform (MSAP) database similar to those used in existing ISCPs, although other types of databases can be used. The CPRs are customized to offer an array of intelligent services selected by individual customers.

The program store 89 stores program instructions which direct operations of the computer serving as the administrative module processor 87. The RAM 91 stores translation tables. In accord with the present invention, these translation tables control routing and/or processing of certain messages through the ISTP. First, these translation tables control translation and routing of those messages which do not trigger access to call processing records (CPRs) stored in a database 97. This includes global title (GTT) type translation and routing as well as routing based on actual DPC values included in the SS7 messages. The translation tables also specify point-in-routing (PIR) information to trigger access to the database 97. The RAM may be implemented as a disc storage unit, but preferably the RAM comprises a large quantity of semiconductor random access memory circuits providing extremely fast access to information stored therein.

In many installations, ISTPs are implemented as mated pairs, to provide a high level of redundancy. In a mated pair installation, each ISTP may include a call routing database 97, and the two ISTPs communicate to keep records stored therein up to date. Alternatively, there may be one database 97 shared between the two mated ISTPs. For example, all messages addressed to an SCP 40 would go through one of two ISTPs of a particular mated pair 25-A. Whichever ISTP received a particular message would access the appropriate CPR in the shared database 97 to determine how to process the signaling message and the associated call.

Figure 9:
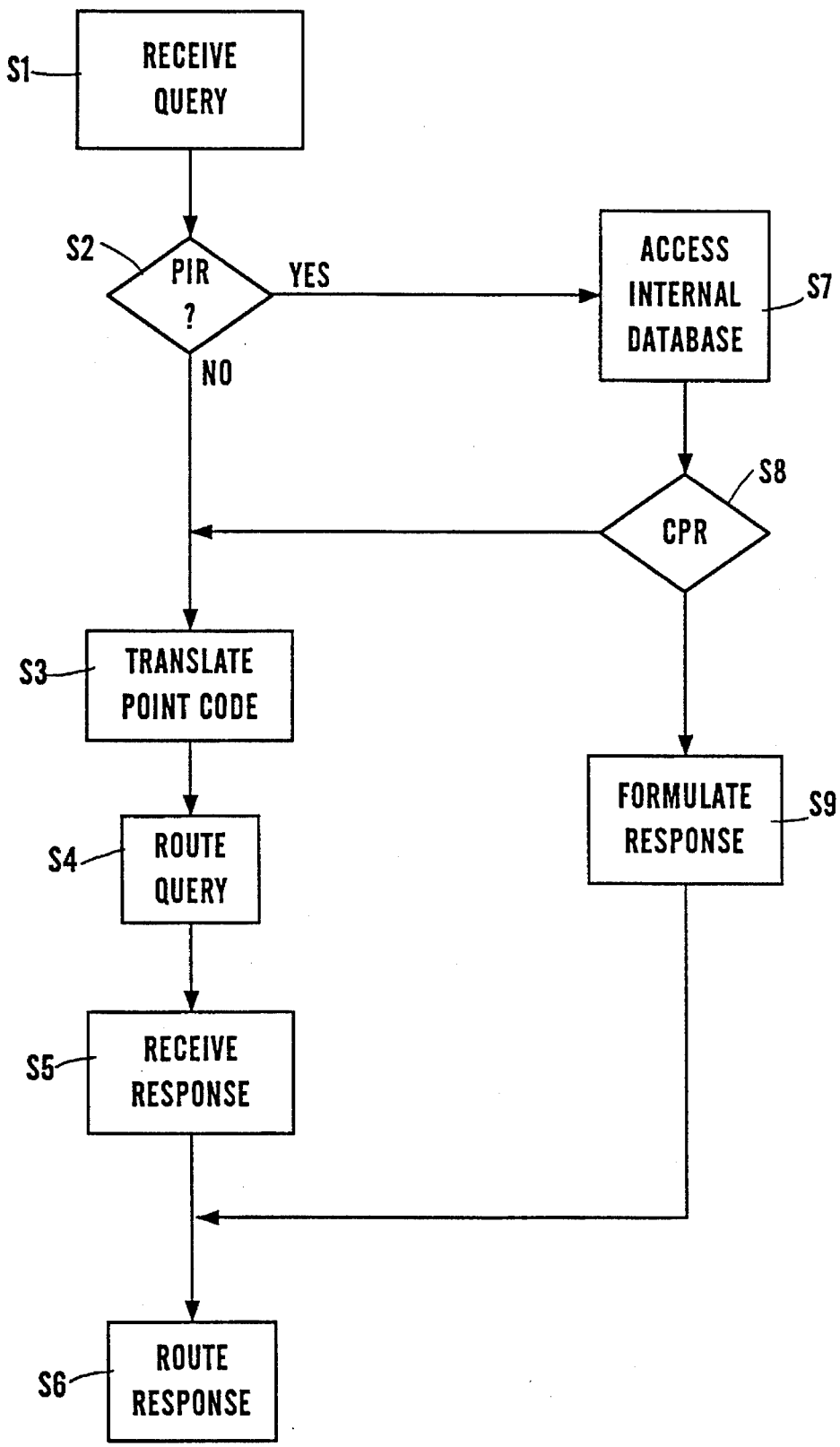
FIG. 9 is a simplified flow diagram of the message processing operations of the ISTP in accord with the present invention.

FIG. 9 is a high level flow diagram of the intelligent signaling message processing of the ISTP 25. As discussed below, the ISTP 25 routes a number of different types of messages. For most communications through the ISTP, one switching office initiates communication by launching a TCAP or ISDN-UP query to some other node of the network. The ISTP of the present invention recognizes the query messages and provides intelligent services in response to at least some of the query messages. Accordingly, whenever the ISTP 25 receives a query message (step S1), processing by the ISTP branches based on whether or not a point in routing (PIR) applies to the particular query (step S2). The PIR may be based on a variety of conditions relating to the query and the call to which the query relates. Typically, the administrative module processor 87 will examine at least some application level information from the query message to determine if a PIR applies.

If no PIR applies, then the ISTP should translate and route the message in the normal manner using GTT translation or routing based on a DPC included in the query message. Processing therefore branches to step S3. In step S3, the ISTP 25 translates the destination point code as appropriate, using translation information from the RAM 91. The ISTP 25 routes the query message to the destination using the translated point code information (step S4). Subsequently, the ISTP 25 will receive a response message from the node addressed by the translated query message (step S5). The response message includes actual points codes which are reversed from those in the query, i.e. the DPC from the query is now the OPC in the response and the OPC from the query is now the DPC in the response. The ISTP routes the response through the switch fabric (step S6), back to the office that launched the query.

However, when the ISTP 25 receives a query message (step S1), at step S2 the processing by the ISTP branches to step S7 if the administrative module processor 87 determines that a point in routing (PIR) applies to the particular query. The administrative module processor 87 identifies a CPR that relates to the present call and accesses that CPR in the database 97. The CPR controls further processing of signaling messages by the ISTP and the resultant processing of calls through the elements of the communication network.

The CPR typically causes branching of call processing based on subscriber specified criteria. This branching is shown in simplified form as step S8 in FIG. 9. In a number of the simplified telephone call screening examples discussed below, the ISTP will forward the query message unchanged under certain conditions. If the query message satisfies those conditions or criteria, then the processing branches to step S3 for further processing of the type discussed above. The ISTP 25 translates the destination point code in the query message as appropriate (S3) and routes the query message to the destination using the translated point code information (step S4). Subsequently, the ISTP 25 will receive a response message from the node addressed by the translated query message (step S5). The ISTP routes the response through the switch fabric (step S6), back to the office that launched the query.

Returning to step S8, under different call related conditions or criteria, the CPR will indicate that the ISTP is to formulate an actual response message (step S9). In some of the examples, the query is in ISDN-UP protocol addressed to a terminating end office. In such a case, the ISTP formulates a response in a format that appears as if that office had responded, e.g. with a 'destination-busy' status indication. Alternatively, the query message may be in TCAP format and in some cases addressed to the ISTP itself. In response to such a TCAP query, the ISTP uses the CPR to translate information from the query into an appropriate call processing instruction, e.g. to route to a number, to play an announcement and collect digits, etc.

In either case, the ISTP translates the destination point code information from the original query message, if necessary, reverses the destination and origination point codes from the query message and uses the reversed point codes to control routing of the response message. The ISTP then routes the response type signaling message back to the switching office that launched the query (step S6).

In each case, the switching office receiving the response message from the ISTP will resume its processing of the call in accord with at least some information taken from the response message.

The present invention can provide AIN-like intelligent call processing functionalities without requiring setting of a trigger in an end office for every type of intelligent processing service. For example, the present invention can provide intelligent screening on both incoming and outgoing interoffice telephone calls, without requiring a trigger in either the terminating or the originating office. Instead, the ISTP itself triggers database access, and in this case the screening functionality, in response to normal ISDN-UP query messages.

5. Call Processing

For convenience, the discussion of call processing will begin with a description of processing of a number of different types of telephone calls.

A central office switching system or CO shown in FIGS. 1A and 1B normally responds to a telephone service request on a local communication line connected thereto, for example an off-hook followed by dialed digit information, to selectively connect the requesting line to another selected local communication line, e.g. to establish a voice call communication link from telephone station A to telephone station B (FIG. 1A). The connection can be made locally through only the connected central office switching system. For example, for a voice telephone call from station A to station B, the SSP-CO 11 provides the call connection without any connection to another central office. When the called line connects to a distant station, for example when station A calls station C, the voice connection is made through the connected central office switching system SSP-CO 11 and at least one other central office switching system SSP-CO 17 through the telephone trunks interconnecting the two central office switches.

In the normal plain old telephone service (POTS) type call processing, the central office switching system (CO) responds to an off-hook at one of the telephone stations and receives dialed digits from the calling station. The central office switching system analyzes the received digits to determine if the call is local or not. If the called telephone station is local and the call can be completed through the one central office, the central office switching system connects the calling station to the called station. If, however, the called station is not local, the call must be completed through one or more distant central offices, and further processing is necessary. If at this point the call were connected serially through the trunks and appropriate central offices between the caller and the called party using in channel signalling, the trunks would be engaged before a determination is made that the called line is available or busy. Particularly if the called line is busy, this would unnecessarily tie up limited voice trunk circuit capacity. The CCIS system was developed to alleviate this problem.

Consider now the simplest specific example of a call from station A to station C wherein standard CCIS routing is to apply. Each node of the signaling network, including the various switching offices and databases in each network, is assigned a 9-digit point-code for purposes of addressing signaling messages through the CCIS network. For purposes of discussion, assume that in FIG. 1A end office 11 has a point code of 246-103-001 and end office 17 has a point code of 255-201-104.

The user at station A picks up his phone and dials the number of station C. An administrative module processor within end office switch 11 loads subscriber profile information from disc storage into an available register in a call store. The number for station C resides in end office 17. The SSP end office 11 generates an Initial Address Message (IAM). The IAM message has the destination point code of end office 17, namely, point code 255-201-104. It also has an originating point code of end office 11, namely, 246-103-001, in addition to miscellaneous other information needed for call set-up such as the destination number of station C and the calling party number of station A. The end office 11 transmits the IAM message over a data link to the ISTP 25-A.

The ISTP 25-A looks at the message and determines that the message was not for it as an ISTP but rather is for end office 17. In this example, assume there is no PIR to trigger intelligent processing by the ISTP 25-A. The ISTP therefore executes its normal translation and routing process to forward the message to the correct end office 17.

End office 17 receives the IAM message which includes the called telephone number and determines whether or not the line is busy. In response to an IAM message, the end office 17 formulates an Address Complete Message (ACM). The ACM includes a variety of information, including a calling party status indicator, e.g. line free or busy. If the line is not busy, the end office 17 rings the station C and generates an Address Complete Message (ACM) to indicate that it received the request for a call and that the number is not busy. The ACM message is sent back by simply reversing the point codes. Now the destination point code is that of end office 11 (246-103-001), and the originating point code is that of end office 17 (255-201-104). The message goes back to the end office 11 through the ISTP 25-A, to indicate that the IAM was received and processed. The return message (ACM in this case) does not result in translation or PIR triggering. In response to the ACM message, the originating end office 11 applies a ring-back tone signal to the line to station A.

As soon as the phone is answered at end office 17, that office sends an Answer Message (ANM) back to end office 11 through the ISTP 25-A, indicating that the phone C was picked up; and at that time the actual telephone traffic trunks are connected together through any intermediate offices that may act as tandems on the particular call and the trunks to the end offices 11 and 17. The return message (ANM in this case) includes an actual destination point code (the origination point code 246-103-001 from the IAM message) and does not result in translation or PIR triggering. End office 11 connects the line to station A to the trunk through any tandem offices to the end office 17, and end office 17 connects the line to station C to the trunk so that communication is established.

As a second example, assume that the call is to be screened based on criteria set by the calling party. The subscriber may establish other screening criteria, but for this simple example, assume that the subscriber at station A has elected to permit interoffice calls (including long distance calls) only during a predetermined time window. Again, the process starts when the user at station A picks up his phone and dials the number of station C. The administrative module processor within end office switch 11 loads the subscriber profile information from disc storage into an available register in a call store. The number for station C resides in end office 17. The SSP end office 11 generates an Initial Address Message (IAM). The IAM message again has the destination point code of end office 17, namely, point code 255-201-104 and the originating point code of end office 11, namely, 246-103-001, in addition to miscellaneous other information needed for call set-up including the destination number of station C and the calling party number of station A. The end office 11 transmits the IAM message over a data link to the ISTP 25-A.

To this point processing is identical to the steps in the immediately preceding example. However, the processing in the ISTP is quite different.

The ISTP 25-A looks at the message and determines that the message relates to a calling subscriber's line having an intelligent call processing feature. More specifically, the translation information stored in the RAM 91 includes a point in call (PIR) triggering access to the subscriber's CPR in the database 97. The administrative module processor 85 therefore retrieves the CPR corresponding to the line to station A and uses that CPR to determine how to proceed.

Assume first that the call occurs outside of the window of time during which the subscriber has elected to permit interoffice calls. The call therefore should be blocked. In accord with the present invention, the administrative module processor 87 formulates an Address Complete Message (ACM). As noted above, the ACM includes a calling party status indicator, and in the present case, the processor 87 includes a busy status indicator in that field of the ACM. The processor 87 reverses the point codes from the IAM message, so that now the destination point code is that of end office 11 (246-103-001), and the originating point code is that of end office 17 (255-201-104). The processor 87 sends the ACM message back through the switch fabric 83 and the appropriate interface module 81 and data link to the end office 11. To the end office 11, the response message appears as if it came from the end office 17 in answer to the IAM query regarding the call from A to C. In response, the end office 11 connects the line from station A to a busy tone trunk circuit, to provide a busy signal to the caller.

Assume now that a call from A to C occurs within the window established by the subscriber. When the IAM query message reaches the ISTP 25-A, the administrative module processor 85 again retrieves the CPR corresponding to the line to station A and uses that CPR to determine how to proceed. In this case, however, the CPR indicates that the subscriber has elected to permit the call. The ISTP therefore executes its normal translation and routing process to forward the message to the correct end office 17, without modification. The end office 17 responds in the normal manner with the ACM message indicating whether or not the line to station C is busy, and if not busy, the end offices 17 and 11 proceed to establish the connection between A and C when a party answers at station C, exactly as discussed above.

The above call screening based on time of day is but one simple example of a screening function, applied to outgoing calls, which may be provided by the present invention. Each subscriber may define their own customized screening procedure, and a corresponding customized CPR is set-up and maintained in the database 97 of the serving ISTP(s) 25. For example, the CPR in the database 97 may include screening criteria based on characteristics of the destination, e.g. to permit interoffice calls to only selected area codes and/or selected dialed numbers. As another alternative, the CPR in the database 97 may permit only a specified threshold number of interoffice calls within some time period, e.g. five calls a day. Those skilled in the art will recognize that the CPRs can and will include a variety of additional screening criteria, as defined by individual customers.

The call processing of the present invention applies equally well to screen incoming interoffice calls, e.g. calls to the station C. As in the earlier example, the subscriber at station C may select from a wide variety of screening criteria. For example, the CPR in the database 97 may include screening criteria based on characteristics of the origin of the call, e.g. to permit incoming calls only from selected calling party line numbers. A more detailed example of incoming call screening appears in commonly assigned U.S. patent application Ser. No. 08/524,306 filed on Sep. 6, 1995 entitled 'Intelligent Signal Transfer Point', the disclosure of which is incorporated herein by reference.

The other SSPs providing telephone services will similarly communicate through one or more ISTPs 25 to obtain the same CCIS communications and high level control functionality. In the preferred embodiment, the SSP-HDTs process telephone calls in a manner analogous to that of an end office switch. To illustrate this point, consider again the normal call and screened call examples discussed in detail above but here relating to a call from station D to station C. For purposes of discussion, assume that in FIG. 1A SSP-HDT has a point code of 246-103-008 and end office 17 has a point code of 255-201-104.

The user at station D picks up his phone and dials the number of station C. The HDT 180 and the ONU 210 establish a channel through the optical fibers 190 (FIG. 1B). The ONU 210 provides two-way conversion between the signal formats on the subscriber's drop cable 215 to the station D and the digital signals on the established channel to HDT 180. The administrative module processor 1861 collects the dialed digits and the ANI of the line of calling station D in an available register in call store 1855. The administrative module processor within SSP-HDT 180 also loads subscriber profile information from disc storage into the register in the call store.

The dialed number for station C resides in end office 17. The SSP-HDT 180 generates an Initial Address Message (IAM). The IAM message has the destination point code of end office 17, namely, point code 255-201-104. It also has an originating point code of SSP-HDT 180, namely, 246-103-008, in addition to miscellaneous other information needed for call set-up such as the destination number of station C and the calling party number of station D. The SSP-HDT 180 transmits the IAM message over a data link to the ISTP 25-B.

If the controlling CPR were that of the calling subscriber at station D, such a CPR resides in the database(s) 97 of the ISTPs of mated pair 25-B. For purposes of this example, however, it has been assumed that the call is not to be screened. Accordingly, there is no PIR to trigger intelligent processing by the ISTP 25-B. The ISTP 25-B therefore looks at the message, determines that the message was not for it as an ISTP but rather is for end office 17, and forwards the IAM message to one of the ISTPs 25-A.

The ISTP 25-A looks at the message and determines that the message was not for it as an ISTP but rather is for end office 17. Again, in this example, there is no PIR to trigger intelligent processing by the ISTP 25-A. The ISTP 25-A therefore executes its normal translation and routing process to forward the message to the correct end office 17.

End office 17 receives the IAM message which includes the called telephone number and determines whether or not the line is busy. In response to an IAM message, the end office 17 formulates an Address Complete Message (ACM). The ACM includes a variety of information, including a calling party status indicator, e.g. line free or busy. If the line is not busy, the end office 17 rings the station C and generates an Address Complete Message (ACM) to indicate that it received the request for a call and that the number is not busy. The ACM message is sent back by simply reversing the point codes. Now the destination point code is that of SSP-HDT 180 (246-103-008), and the originating point code is that of end office 17 (255-201-104). The message goes back to the SSP-HDT 180 through the ISTPs 25-A and 25-B, to indicate that the IAM was received and processed. The return message (ACM in this case) does not result in translation or PIR triggering. In response to the ACM message, the originating SSP-HDT 180 applies a ringback tone signal to the line to station D through the appropriate channel on the fibers and the ONU 210.

As soon as the phone is answered at end office 17, that office sends an Answer Message (ANM) back to SSP-HDT 180 through the ISTPs 25-A and 25-B, indicating that the phone C was picked up; and at that time the actual telephone traffic trunks are connected together through the connecting trunks between the end office 17 and the SSP-HDT 180 and any intermediate offices that may serve as tandems on the particular call. The return message (ANM in this case) includes an actual destination point code (the origination point code 246-103-008 from the IAM message) and does not result in translation or PIR triggering in any of the ISTPs. SSP-HDT 180 logically connects the telephone channel assigned to the call from station D to the trunk providing the link to the end office 17, and the end office 17 connects the line to station C to the trunk providing the connection to the SSP-HDT 180, so that communication is established.

As a second example of calls through an HDT, assume that the call from D to C is to be screened based on criteria set by the calling party, in this example, the subscriber at station D. The subscriber may establish other screening criteria, but for this simple example, assume again that the subscriber at station D has elected to permit interoffice calls (including long distance calls) only during a predetermined time window. The CPR for this type of screening is maintained in the database(s) 97 within the mated pair of ISTPs serving the SSP coupled to the line to station D. Since station D is served through SSP-HDT 180 and that SSP connects to ISTP pair 25-A, the CPR for the subscriber at station D resides in the database(s) 97 within the mated pair of ISTPs 25-B.

In the present telephone call example, the process again starts when the user at station D picks up his phone and dials the number of station C. The telephone channel is set up between station D and the SSP-HDT 180, and the administrative module processor 1861 within the SSP-HDT 180 loads the dialed digits, the ANI of the line of station D and the subscriber profile information from disc storage into an available register in the call store 1863. The number for station C resides in end office 17. The SSP-HDT 180 generates an Initial Address Message (IAM). The IAM message again has the destination point code of end office 17, namely, point code 255-201-104 and the originating point code of SSP-HDT 180, namely, 246-103-008, in addition to miscellaneous other information needed for call set-up including the destination number of station C and the calling party number of station D.

The SSP-HDT 180 transmits the IAM message over a data link to the ISTP 25-B. To this point processing is identical to the steps in the immediately preceding example. However, the processing in the ISTP 25-B is quite different.

The ISTP 25-B looks at the IAM query message and determines that the message relates to a calling subscriber's line having an intelligent call processing feature. More specifically, the translation information stored in the RAM 91 includes a point in call (PIR) triggering access to the subscriber's CPR in the database 97. The administrative module processor 85 therefore retrieves the CPR corresponding to the line to station D and uses that CPR to determine how to proceed.

Assume first that the call occurs outside of the window of time during which the subscriber has elected to permit interoffice calls. The call therefore should be blocked. In accord with the present invention, the administrative module processor 87 formulates an Address Complete Message (ACM). As noted above, the ACM includes a calling party status indicator, and in the present case, the processor 87 includes a busy status indicator in that field of the ACM. The processor 87 reverses the point codes from the IAM message, so that now the destination point code is that of SSP-HDT 180 (246-103-008), and the originating point code is that of end office 17 (255-201-104). The processor 87 sends the ACM message back through the switch fabric 83 and the appropriate interface module 81 to the SSP-HDT 180. To the SSP-HDT 180, the response message appears as if it came from the end office 17 in answer to the IAM query regarding the call from D to C. In response, the SSP-HDT 180 connects the voice telephone channel from station D to a busy tone trunk circuit, to provide a busy signal to the caller.

Assume now that a call from D to C occurs within the window established by the subscriber. When the IAM query message reaches the ISTP 25-B, the administrative module processor 85 again retrieves the CPR corresponding to the line to station D and uses that CPR to determine how to proceed. In this case, however, the CPR indicates that the subscriber has elected to permit the call. The ISTP 25-B therefore executes its normal translation and routing process to forward the message through ISTP pair 25-A to the correct end office 17, without modification. The end office 17 responds in the normal manner with the ACM message indicating whether or not the line to station C is busy, and if not busy, the end office 17 and the SSP-HDT 180 proceed to establish the connection between D and C when a party answers at station C, exactly as discussed above.

As shown by the above examples, the relevant CPRs controlling the telephone call services reside in different ISTPs 25 depending on which subscriber's services the CPR relates to. The CPR for the subscriber at station C resides in the serving ISTP pair 25-A, and the CPR for the subscriber at station D resides in the serving ISTP pair 25-B. The PIRs to trigger access to the CPRs are typically set in the same serving ISTP. Call screening and other advanced telephone service features can be controlled by such CPRs on outgoing calls as well as incoming calls.

In an Advanced Intelligent Network (AIN) type system, such as shown in FIGS. 1A and 1B, certain telephone and packet calls receive specialized AIN type processing under control of data files stored in the SCP data base 43 within the ISTP 25. In such a network, the SSP type local offices of the public telephone network include appropriate data in the translation tables for customers subscribing to AIN services to define certain call processing events identified as AIN "triggers". Using the translation table data from disc memory 63, an SSP-CO will detect such triggering events during processing of calls to or from such AIN service subscribers.

The SSP type CO switches can recognize a variety of events as triggers for activating a query and response type AIN interaction with the ISTP. A number of different AIN triggers are used, such as off-hook immediate, off-hook delay, dialed number, termination attempt, private dialing plan, etc., depending on the precise type of service the AIN will provide a particular subscriber.

The CPRs stored in the database 97 provide intelligent network control of AIN related services activated by specific trigger events. In this regard, the ISTP of the present invention actually replaces a portion or all of the call processing control functionality of an ISCP. For this type of service, the CPRs formerly maintained in an ISCP are stored in the database 97 within the ISTP 17. When one of the telephone switching offices 11 or 17, the SSP-HDTs 180 or the SSP type ATM switch 410 detects a point in call (PIC) triggering a query transmission, the triggered switching office would send the TCAP query to the ISTP 25-A or 25-B connected thereto. The administrative module processor 87 within the ISTP 25 would access the appropriate CPR and formulate a TCAP call control response message in accord with the subscriber's customized service. The processor 87 sends the response message through the switch fabric 83 and the appropriate interface module 81 and data link to the SSP control node that launched the particular query. In response, the SSP control node processes the call using information from the TCAP response message.

Using the TCAP query and response procedure, the ISTP can offer virtually all incoming and outgoing service features previously offered by AIN through the CPRs maintained in the ISCP. For still other services, the ISTP may screen signaling messages addressed to other databases, such as the SCP 40 shown in FIG. 1A.

For example, if a subscriber has a speech responsive autodialing service for telephone calls, an off-hook immediate trigger might be stored in the translation table file for that subscriber in the SSP-CO. The SSP-CO would detect the trigger each time the subscriber goes off-hook on that line and then attempt to obtain further instructions from the ISTP. The ISTP would instruct the SSP-CO to route the out-going call to a network node having speech recognition capabilities. Similar triggers are detectable by the CO's during packet data call processing, and similar triggers are detectable by SSP type HDT's and the SSP type ATM switch during voice, packet data and/or broadband call processing.

In a first embodiment of processing of broadband calls or service requests for broadcast services, the SSP-HDT 180 treats all broadcast channel requests as AIN triggers. Input of a broadcast channel request would appear similar to an off-hook delay type trigger, used for certain types of AIN processing for voice telephone calls.

When a subscriber selects a broadcast channel, the administrative module processor 1861 within the HDT 180 would recognize the channel selection as a trigger and suspend call processing. The SSP-HDT 180 then compiles a TCAP formatted call data message and forwards that message via a common channel interoffice signalling (CCIS) link to the serving ISTP 25 which includes the data base 97. The SSP-HDT 180 inserts a global title translation (GTT) value in the destination point code field of the SS7 message, to effectively address the query message to the ISTP storing the relevant CPR. In the network of FIG. 1A, the query message goes to one of the ISTPs in the mated pair 25-B. The TCAP call data message would identify the subscriber and the particular one of the subscriber's DET's 217 from which the request originated and would include at least the input digits representing the broadcast service request, typically the selected channel. The message may identify one of a plurality of broadcast service provider type VIPs accessible through the network, either based on a concurrent VIP selection or on an earlier choice of a broadcast service provider.

The ISTP in pair 25-B accesses the data tables stored in data base 97 to translate the received message data into a call control message. For example, the ISTP 25 may determine that the requested channel is a basic service broadcast channel offered by the particular VIP, with no access restrictions, and formulate a message identifying the respective optical fiber 170 and the particular DS-3 and ATM virtual circuit on that fiber which transports the requested program service. The ISTP 25 returns the call control message to the SSP-HDT 180 via CCIS link. The SSP-HDT then uses the call control message to complete the particular broadband call. In the basic service example given above, the SSP-HDT 180 would respond by supplying the cell stream for the requested service to the subscriber's DET 217.

As the HDT 180 routes selected channels to the DET's 217, the HDT would accumulate usage data for the subscribers serviced thereby. The HDT 180 would periodically upload such usage data to an appropriate billing system 15 operated by the TELCO. The billing system would maintain data tables for broadcast service charges for services offered by the various broadcast VIPs. Any usage charges for broadcast viewing would appear on the subscriber's telephone bill. The TELCO collects the broadcast viewing charges and splits the collected monies with the various broadcast VIPs, on some agreed percentage basis or the like.

As an alternative to the real time control of broadcast program selection and access by the ISTP 25 for every channel selection in the above processing embodiment, certain relevant control data could be stored in subscriber profile tables in the disc storage 1863 in each HDT 180. With this modification, the broadcast VIPs would provide provisioning data for downloading and storage in the HDT 180, including broadcast channel mapping information and subscriber authorization control information.

The channel mapping information specifies what programs are carried on each ATM virtual circuit, within each DS-3, on each respective optical fiber 170. The administrative module processor 1861 within the HDT 180 accesses the channel mapping information in response to each program selection by a subscriber to route the corresponding ATM cell stream to the requesting DET 217.

The authorization control data would identify each VIPs pay-per-view or premium program services as AIN triggers. The authorization control data may also identify certain channels that the subscriber has identified for restricted access, i.e. not for viewing by children, as AIN triggers. These broadband triggers are similar to dialed number triggers used to trigger certain types of AIN processing for voice telephone calls.

In the alternative processing routine, when a subscriber selects a channel, the administrative module processor 1861 within the HDT 180 would recognize whether or not the channel selection constituted a trigger based on information retrieved from disc storage 1863. If not, the administrative module processor 1861 would instruct the internal ATM switch 1857 and the line interface module servicing the subscriber to route the ATM cells for the selected channel to the subscriber's DET 217, using the channel mapping data in the manner outlined above. However, if the selected channel is some form of restricted service channel, e.g. premium service, pay-per-view, or restricted by designation by the subscriber, then the administrative module processor 1861 would recognize the channel selection as a point in call (PIC) serving as a broadband type AIN trigger.

Upon detecting that the channel selection is a broadband type AIN trigger, the SSP-HDT 180 suspends call processing, compiles a TCAP formatted call data message and forwards that message via a common channel interoffice signalling (CCIS) link to the ISTP 25. The SSP-HDT 180 addresses the message to the ISTP storing the CPR for controlling this service, e.g. by using an appropriate GTT value. In the network of FIG. 1A, the SSP-HDT 180 addresses the message to the ISTPs 25-B which store the CPRs for broadband subscribers served through the particular SSP-HDT. One of the ISTPs in pair 25-B receives and responds to the addressed query message, specifically, the receiving ISTP accesses its data tables in data base 97 to translate the received message data into a call control message. For example, the ISTP 25 may determine that the requested channel is a premium channel and whether or not the requesting subscriber is currently entitled to receive that service. If so, the call control message would include appropriate instructions to route the cell stream for the requested service to the subscriber's DET 217. The ISTP 25 returns the call control message to the SSP-HDT 180 via CCIS link. The SSP-HDT then uses the call control message to complete the particular broadband call by supplying the cell stream for the requested service to the subscriber's DET 217. As the HDT 180 routes selected channels to the DET's 217, the HDT would accumulate usage data for the subscribers serviced thereby. The HDT 180 would upload such usage data to the billing system 15 operated by the TELCO for processing in the manner discussed above.

In either of the broadcast service request processing embodiments, if the data in the SCP data base 43 mandates a PIN routine, before instructing the SSP-HDT 180 to route the cell stream for the selected broadcast channel to the DET, the ISTP 25 would instruct the SSP-HDT 180 to prompt the subscriber and collect digits. The SSP-HDT 180 would transmit a page of text/graphics via the signaling channel to the subscriber's DET requesting input of a code. The subscriber reviews the prompting message and inputs an appropriate number of digits by operating the remote control of the DET 217. In response, the DET 217 transmits a corresponding message upstream through the signaling channel identifying the keys operated by the subscriber in response to the prompt. The SSP-HDT 180 receives the message and relays the identified key digits through the CCIS link to the ISTP 25 processing the particular call. The ISTP 25 compares the digits to one or more valid PIN numbers associated with the requesting subscriber and/or the particular broadcast service in the CPR. If the input digits correspond to a valid PIN, then the ISTP 25 returns a call control message to the SSP-HDT 180 instructing it to proceed with routing of the appropriate ATM cell stream for the requested broadcast service to the subscriber's DET, in the manner discussed above.

In either of the processing embodiments for broadcast video services, if the ISTP 25 determines that the caller should not receive the requested service, e.g because the caller is not a valid subscriber to the requested service or failed to enter a valid PIN, the ISTP will instruct the SSP-HDT 180 to transmit an appropriate denial notice to the subscriber's DET 217. Typically, this notice will take the form of a page of text and/or graphics indicating a denial, the reason for the denial and/or possibly suggesting further options (e.g. to select another service). The SSP-HDT 180 transmits this notice to the DET 217 through the narrowband signaling channel serving that DET, and the DET provides signals to generate a corresponding output display on the associated television set 217'.

Similar routines can control pay-per-view services offered through the broadcast channels. The broadcast VIP would identify certain channels as carrying pay-per-view. Selection of any such channel would trigger AIN processing by the SSP-HDT, either because any channel selection triggers AIN processing or because selection of the particular channel has been designated a PIC or trigger by data set up in the translation tables stored in the HDT. In either event, the ISTP 25 would instruct the HDT 180 to prompt the subscriber for an agreement to purchase the channel.

The HDT 180 would transmit a page of text and/or graphics through the signaling channel to the DET 217 for display on the television 217'. This page effectively would request that the caller agree to pay for the requested event. The page may identify the event and the provider or 'VIP'. This page typically will indicate the amount of payment required, and may request input of a specific code or even a PIN as the indication of assent to the purchase. The subscriber reviews the prompting message and inputs an appropriate code digit(s) by operating the remote control of the DET 217. In response, the DET 217 transmits a corresponding message upstream through the signaling channel identifying the key or keys operated by the subscriber in response to the prompt.

The SSP-HDT 180 receives the message and relays the identified keyed input digits through the CCIS link to the ISTP 25. The ISTP 25 processes the digits to determine if the subscriber has assented to purchase the event in a valid manner (e.g. by entering the appropriate code or PIN number associated with the requested event). If assent is valid, then the ISTP 25 returns a call control message to the SSP-HDT 180 instructing it to proceed with routing the cell stream for the pay-per-view event to the subscriber's DET 217 for display on the television 217'. If for some reason, the ISTP determines that the subscriber is not entitled to receive the pay-per-view event, e.g. because of a failure to enter a valid PIN, the ISTP 25 would instruct the SSP-HDT 180 to transmit an appropriate denial message, as outlined above.

Upon actual routing of the pay-per-view event cell stream to the DET 217, the HDT 180 would compile an appropriate billing message identifying the subscriber, the event and the time/date of purchase. The HDT 180 would transmit that message to the billing system 15 for further processing. For example, the system 15 may store data from the pay-per-view service provider indicating the charge for the particular event. The billing system would add that charge to the subscriber's telephone bill. The TELCO would collect payment and would split the money with the provider on some percentage basis agreed to in contract between the TELCO and the provider.

A subscriber requests an interactive communication with a VIP in a manner analogous to going off-hook and dialing a destination on a telephone. When a subscriber activates the DET to initiate an outgoing call to an interactive service provider, the DET 217 first initiates signaling communications with the SSP-HDT 180 indicating the intent to initiate an interactive broadband call. This, in effect, is the broadband "off-hook" signal. The user next activates specific keys on the DET 217 or its associated remote control to identify or "dial" the broadband interactive VIP of choice for purposes of the present call. In response, the user's DET 217 transmits a signal identifying the numbers input by the user upstream to the SSP-HDT 180. The SSP-HDT 180 could recognize the broadband interactive "off-hook" and interactive VIP selection digits as an AIN trigger in all cases, in a manner essentially similar to processing an off-hook delay type trigger on voice grade telephone calls. In the presently preferred embodiment, however, the SSP-HDT 180 and the ISTPs 25 process the interactive service calls in a manner directly analogous to the interoffice call processing routines for telephone service calls discussed in detail above.

In the preferred interactive service call processing, the SSP-HDT 180 does not recognize the selection of an interactive service VIP as a trigger on all interactive service calls. The SSP-HDT 180, may recognize such a selection as a trigger under certain circumstances, e.g. if the call originates from a subscriber or is directed to a VIP who has established some AIN type service feature requiring such a trigger. However, for most interactive broadband calls, the SSP-HDT 180 does not recognize the VIP selection as a trigger. Instead, the SSP-HDT formulates and sends an Initial Address Message (IAM) type SS7 query message. In the address header portion of the message, the origination point code (OPC) is that of the SSP-HDT 180 (246-103-008 in the earlier examples). The message also includes a predetermined global title translation (GTT) value as the destination code.

In this case, the GTT effectively serves as an indication that the message relates to a request for an interactive broadband call. The SSP-HDT 180 transmits the IAM query over the appropriate CCIS packet data link to an available one of the ISTPs in the serving pair 25-B. Normally, as the ISTP processes any message at the SCCP protocol level, the ISTP will determine whether the called party address field contains an actual destination point code (DPC) or a global title translation (GTT) value. If the called party address field contains a complete destination point code (DPC) value, no translation is needed and the ISTP routes the message based on the actual DPC value. If, as in the present example, the called party address field contains a GTT value, a translation is necessary. The administrative module processor 87 retrieves the translation information corresponding to the particular GTT value from the RAM 91. For interactive broadband service calls, the GTT translation information stored in the RAM 91 will result in detection of a PIR.

The PIR triggers access to the associated routing control data base 97. The IAM query message includes called and calling party information. In the present example, the called party information is a selection number identifying a selected interactive service VIP. The administrative module processor uses the called party information from the IAM-query to retrieve a CPR relating to the called VIP.

As noted earlier, the VIPs operate equipment wherein the level 2 gateway 401 has CCIS communications capabilities and may function as a full SSP. The CPR may specify a variety of special service type processing, if contracted for by the selected VIP. In the preferred simplest case, however, the CPR provides information as to how to route signaling messages and/or calls for the VIPs equipment.

In particular, the VIP's CPR provides a destination point code (e.g. 255-201-106) for the SSP at the level 2 gateway of the selected VIP. At the SCCP protocol processing level, the ISTP 25 replaces the information in the address indicator with a new indicator showing that the called party address contains an actual DPC value, and replaces the called party address octets with the destination point code (255-201-106) from the CPR in database 97. The ISTP forwards the message using the DPC value, i.e. to the level 2 gateway 401.

The VIP 400 will establish a number of its own procedures for screening incoming calls. At the very least, most such VIPs will keep payment history records for their customers and will accept or deny a call based on the payment status of a particular caller. The level 2 gateway 401 may refuse calls from non-subscribers and will refuse calls from deadbeat customers. The level 2 gateway 401 also monitors the operation of the VIPs server equipment 403, and can determine whether or not a server port is available to service the current incoming call.

The SSP type level 2 gateway 401 therefore responds with an Address Complete Message (ACM) indicating that it received the request for a call and whether or not a port is available. Assume first that the level 2 gateway responds with a status indication of 'busy,' either because all server ports are busy or because the level 2 gateway 401 has determined that the VIP intends to refuse calls from the particular subscriber's terminal device.

The ACM message with the busy indication is sent back by simply reversing the point codes. Now the destination point code is that of SSP-HDT 180 (246-103-008), and the originating point code is that of level 2 gateway 401 (255-201-106). The message goes back to the SSP-HDT 180 through the ISTP 25-B and the appropriate data links, to indicate that the IAM was received and processed. The return message (ACM in this case) does not result in translation or PIR triggering. In response to the ACM message, the originating SSP-HDT 180 transmits a signaling message to the DET 217 indicating that the interactive call could not be completed. The DET 217 generates an appropriate display for presentation to the caller on the associated television set 217'.

Assume now that when the level 2 gateway 401 receives the IAM message regarding the incoming interactive service call, the gateway 401 decides to accept the call and a server port is available. In this case, the level 2 gateway 401 generates an ACM message indicating that the called destination is available. Again, the gateway 401 reverses the point codes from the IAM message and sends the ACM response message back to the SSP-HDT 180 through the ISTP 25-B and the appropriate data links. The return message (ACM in this case) does not result in translation or PIR triggering.

The level 2 gateway 401 also activates output of the server 403 through an assigned port and formulates and sends an Answer Message (ANM). Here, the ANM message is equivalent to the notice on an answer or pick-up condition at a called telephone station. The return message (ANM in this case) includes an actual destination point code (the origination point code 246-103-008 from the IAM message) and does not result in translation or PIR triggering.

The level 2 gateway 401 and the SSP-HDT 180 both communicate with the ATM switch 410 to obtain an interoffice ATM virtual connection to carry the broadband downstream traffic from the server port to the SSP-HDT 180. Typically, the level 2 gateway 401 sends an SS7 message identifying the call and specifying the port, the DS-3, a VPI/VCI value and the requested bandwidth for the call. The SSP-HDT 180 sends an SS7 message identifying the same call and specifying the DS-3 on fiber 415 and a VPI/VCI value. In response to these messages, the administrative module processor 461 assigns and reserves resources of ATM switch fabric 457 to service the call and sends SS7 confirmation messages back to the level 2 gateway 401 and the SSP-HDT 180. The level 2 gateway 401 then instructs the server 403 to commence broadband transmission using the port, DS-3 and VPI/VCI value; and the SSP-HDT routes ATM cells from the DS-3 on fiber 415 and having the VPI/VCI value assigned on that link through the appropriate channels on the fiber 190 and through the ONU 210 to the subscriber's DET 217. The DET 217 decodes the broadband information, as discussed above, and commences presentation of audio and video information from the VIP on the associated television set 217'.

At approximately the same time that the level 2 gateway 401 and the SSP-HDT 180 both communicate with the ATM switch 410 to obtain an interoffice ATM virtual connection, the level 2 gateway 401 and the SSP-HDT 180 execute similar CCIS based communications with one or more SSP-COs 17 that will provide X.25 packet switched data communications to obtain a two-way data link between the HDT 180 and the level 2 gateway. The HDT 180 provides two-way packet switching to route signaling messages to and from the signaling channel on fibers 190 assigned to the DET and the X.25 virtual connection to the level 2 gateway. The HDT 180 also provides two-way protocol conversion from the protocol used between the HDT and the DET and that used on the X.25 packet switch link.

Once the communication session is set up, the DET 217 can transmit control signaling information upstream through the ONU 210, the HDT 180 and the signaling link to the VIPs level 2 gateway 251, and the level 2 gateway 251 can transmit downstream control signaling information through the corresponding reverse path. For downstream transmission, the server 253 will provide ATM cells with an appropriate header. The ATM switch 410 will route the cells using the header and transmit those cells over fiber 415 to the HDT 180 serving the requesting subscriber. The HDT 180 will recognize the header as currently assigned to the particular DET 217 and will forward those cells through the downstream fiber of pair 190 and the ONU 210 to that DET, in essentially the same manner as for broadcast programming.

When the HDT 180 begins routing ATM broadband cells for the call through to the subscriber's DET, the HDT formulates a message for the billing system 15 identifying the VIP, the subscriber and the start time. The HDT 180 will formulate a similar message to the billing system when the broadband transmissions end and the interactive call is torn down. These messages may be transmitted to the billing system on a real-time basis, as events occur, or the HDT 180 may store the various billing data and periodically upload the messages to the billing system 15 all at once.

Depending on contractual arrangements with the VIPs and/or the subscribers, the interactive connect time may be billed to the VIPs or billed directly to the subscribers. If the VIPs equipment connects to the CCIS network, the level 2 gateway 251 would inform the billing system 15 of subscriber interaction with the VIPs equipment. Consider video on demand as an example. The level 2 gateway could inform the billing system of the type or payment level corresponding to the subscriber selection, and the billing system 15 would add a pre-assigned charge for the video on demand purchase to the subscriber's bill.

As noted earlier, points in call (PICs) may be set in the SSP-HDT, with regard to broadband services, which trigger TCAP based query and response procedures to offer certain enhanced or customized call processing features. For example, one subscriber may which to establish a screening procedure on outgoing calls to interactive broadband service VIPs. The subscriber might choose to require a PIN number routine on all such calls. Another subscriber might want to allow calls to certain VIPs identified by that subscriber but require a PIN number routine on calls to other interactive broadband service VIPs. A variety of other screening criteria could be used, the network operator and/or subscribers can develop a variety of other trigger based call processing services.

For purposes of discussion, consider a simple screening example requiring PIN number entry to complete calls to interactive broadband service VIPs. Again, the call process begins when a user activates the DET 217 to initiate an outgoing call to an interactive service provider. The DET 217 first initiates signaling communications with the SSP-HDT 180 indicating the intent to initiate an interactive broadband call. This, in effect, is the broadband "off-hook" signal. The user next activates specific keys on the DET 217 or its associated remote control to identify or "dial" the broadband interactive VIP of choice for purposes of the present call. In response, the user's DET 217 transmits a signal identifying the numbers input by the user upstream to the SSP-HDT 180. The SSP-HDT 180 recognizes the broadband interactive "off-hook" and VIP selection digits from the particular DET as an AIN trigger set against the subscriber profile for that DET stored in disc memory 1863. This trigger is essentially similar to an off-hook delay type trigger used on voice grade telephone calls.

At this point in the call, the SSP-HDT 180 suspends call processing, compiles a TCAP formatted call data message and forwards that message via a common channel interoffice signalling (CCIS) link to one of the ISTPs in pair 25-B. The SSP-HDT 180 includes a GTT or DPC value in the message effectively addressing the query to the ISTP itself. This TCAP message identifies the subscriber and the DET 217 and contains the dialed digits identifying the called party VIP 400. The ISTP 25 accesses its stored data tables in data base 97 to translate the received message data into a call control message.

The ISTP 25 retrieves routing control information relating to processing of interactive service calls from the subscriber's DETs from data base 97. In the present example, the data indicates that a PIN number functionality is to be applied to access broadband interactive service VIPs from that subscriber's DETs. If the data specifies a PIN number for accessing the VIP, the ISTP 25 would interact with the SSP-HDT 180 to execute a PIN number procedure of the same type as the PIN number routine discussed above relative to broadcast channel selection.

Assuming that the caller enters the correct PIN number, the ISTP 25 formulates a call control message containing appropriate instructions to set up the two-way signaling link and the one-way broadband link between the called VIP 400 and the DET 217. After formulating the call control message, the ISTP 25 returns that message to the SSP-HDT 180 via the appropriate CCIS link. The SSP-HDT 180 then uses the call control message to establish the requisite ATM broadband link and signaling link between the called equipment and the subscriber's DET 217 using the broadband interactive service call processing routine discussed above.

The AIN processes requests for packet data calls in a manner substantially similar to the AIN processing of voice and broadband service requests discussed above. The SSP-COs and the ISTPs 25 would process dial-up type packet data calls from one station 218 to another using the local switching and CCIS processing through the ISTP, e.g. exactly as described in detail above for calls to and from telephone stations. The SSP-HDTs, COs and ISTPs 25 would process dial-up type packet data calls to and from the DETs 217 or packet data equipment connected through the HDTs using the same processes used for voice calls through the HDTs. The use of the data base in the ISTP also allows subscribers to extensively customize their services, including packet data services.

For example, a customer might subscribe to a home banking service. As part of the provisioning of this service for the customer, the TELCO would identify a key or sequence of keys on the subscriber's DET 217 or the associated remote control to initiate a request for "banking" communications services. The TELCO would also obtain identification of the subscriber's bank, and based on that information, determine the type of communication that bank uses, e.g. packet data, voice only, or a combination of broadband and signaling. For purposes of this example, assume that the bank utilizes packet data communications. The TELCO would also identify a communication link to the bank's equipment. Depending on the bank's own security procedures, the TELCO may also apply a PIN number access procedure on calls to the particular bank's data equipment. If so, then the TELCO would assign or obtain from the subscriber a PIN number. The information regarding the subscriber, the bank and any PIN number is stored in an appropriate data table in the ISTP 25. Also, an appropriate trigger is set in the subscriber profile data stored within the SSP-HDT 180 servicing the particular subscriber.

Subsequently, when the user activates the "banking" key(s) on the DET 217 or its remote control, the SSP-HDT 180 would receive the corresponding message from the DET and recognize that message as an AIN triggering event. The SSP-HDT 180 suspends call processing and transmits an appropriate query message in TCAP format to the ISTP 25. This message includes an identification of the subscriber and/or the subscriber's DET 217 and information indicating the subscriber requested "banking" services. The ISTP accesses the subscriber's data table in the data base 97 to identify the subscriber's bank. The information in the subscriber's data table or in a data table associated with the selected bank identifies the relevant type of communication. Assuming here for simplicity that no PIN number routine is required at this point, the ISTP 25 returns a call control type TCAP message to the SSP-HDT 180 instructing it to proceed with a call to the bank's equipment. In the example given, this entails establishing a packet data call between the bank's data equipment and the subscriber's DET 217.

The TCAP response message, for example, would include the destination number of the bank's data equipment. Assuming that the bank's packet data equipment corresponds to terminal 218 shown in FIG. 1A, the packet data call would go through an HDT 180 and CO's 17 and 11. The HDT and COs would go through a CCIS type call processing routine through the relevant ISTPs 25, similar to the exemplary telephone calls from station D to C discussed above. Here the SSP-HDT would be the originating office and CO 11 would be the terminating office. Any CPRs controlling calls to/from packet equipment 218 would reside in data base(s) 97 of ISTP mated pair 25-A.

Although shown only as a personal computer (PC) type terminal device, the bank's packet data equipment may consist of any appropriate packet communication device. For example, the device 218 may provide an interface to an internal packet data network or a local area network that the bank maintains for its real time processing of automatic teller machine operations.

If the data in the data base 97 mandates a PIN routine, before instructing the SSP-HDT 180 to complete the call to the bank, the ISTP 25 would instruct the SSP-HDT 180 to prompt the subscriber and collect digits. The SSP-HDT 180 would transmit a page of text/graphics via the signaling channel to the subscriber's DET requesting input of a code. The subscriber reviews the prompting message and inputs an appropriate number of digits by operating the remote control of the DET 217. In response, the DET 217 transmits a corresponding message upstream through the signaling channel identifying the keys operated by the subscriber in response to the prompt. The SSP-HDT 180 receives the message and relays the identified key digits through the CCIS link to one of the ISTPs 25-B. The ISTP compares the digits to one or more valid PIN numbers associated with the requesting subscriber. If the input digits correspond to a valid PIN, then the ISTP 25 returns a call control message to the SSP-HDT 180 instructing it to proceed with completion of the call to the bank's equipment in the manner discussed above.

For other banks offering voice and DTMF type interfaces for banking services and/or banks offering broadband downstream and two-way signaling interfaces similar to those used for video services, the AIN would utilize techniques similar to those described in the above packet data example to route the subscriber's call to the appropriate equipment operated by each subscriber's bank. For example, if the bank equipment connects to a dial up telephone line for callers using standard telephone sets, the information from the ISTP 25 might instruct the SSP-HDT 180 and one the CO 11 or 17 serving the bank's line to ring both lines simultaneously and provide a voice grade connection when both parties answer. The bank may choose to connect a live operator or an automated voice response system to the voice grade line.

For those subscribers using two or more banks, the ISTP could recognize this fact as part of its processing of the first query and instruct the SSP-HDT 180 to prompt the subscriber for input of a selection of a specific one of the subscriber's banks, in a manner similar to obtaining a PIN number input. Once the subscriber identified the specific bank and that information reached the ISTP 25, call processing would continue as outlined above.

The control through the ISTPs 25 also permits broadband service providers to offer a variety of new customized services through the other communications media (voice and packet data) in combination with their broadband services. For example, a VIP broadcasting a home shopping channel might subscribe to an 800 number for dial up ordering of products offered on that channel. In areas not serviced by the inventive network, viewers would dial the 800 number in the usual manner to order products.

In the inventive network, however, the subscriber would activate the remote control or the keypad on the DET 217 indicating an intent to communicate with the vendor. The DET would send an appropriate signaling message to the HDT 180 identifying the subscriber input. The SSP type HDT 180 would recognize the input as an AIN type trigger event. The SSP-HDT suspends call processing, compiles a TCAP formatted call data message and forwards that message via the common channel interoffice signalling (CCIS) link to the ISTP 25. The TCAP call data message identifies the subscriber and the subscriber's terminal and includes the subscriber input information and data identifying the broadband channel currently being viewed.

The ISTP 25 accesses its stored data tables to translate the received message data into a call control message. In this case, the ISTP recognizes the vendor from the particular channel the subscriber is viewing and recognizes the input as a request for a call to that vendor. The ISTP accesses the data file for the identified vendor to identify the destination number for that vendor (this may require first retrieving the 800 number and translating that number into an actual destination number). The ISTP formulates the call control message to instruct the SSP-HDT 180 to set up a voice call between the subscriber's telephone and the vendor. In part, the message will include both the vendor's telephone number and the subscriber's telephone.

The ISTP 25 returns the call control message to the SSP-HDT 180 via CCIS link. The SSP then uses the call control message to signal the CO 17 to initiate a voice call through the network to the vendor's telephone line, e.g. to ring station C shown in FIG. 1A, and to concurrently ring the subscriber's telephone station D. Normal voice grade telephone communication begins when both parties answer their respective telephone stations. The vendor may have a live operator answer, or some automated voice response system may answer and process the viewer's call. In this call processing scenario, the SSP-HDT 180 signaled the CO 17, however, as an alternative, the ISTP 25 could provide an appropriate instruction message to that CO at the same time that it returned the call control message to the SSP-HDT 180.

A similar procedure can be used to set up a parallel telephone or packet data call while a subscriber is viewing a broadcast program. For example, the AIN processing might recognize activation of certain keys on the DET or remote control as a "PIZZA" call and establish a packet data link from the DET to packet data equipment operated by the viewer's previously specified preferred pizza delivery company. If the subscriber had not previously identified a pizza delivery company, the AIN would provide prompts and collect inputs (similar to a PIN number routine discussed above) to allow the viewer to select a delivery company serving the viewer's geographic location.

During a packet data call to equipment 218 or an interactive broadband call to a VIP 250, the network may determine that the call can not be completed to the called destination, e.g. because all of the ports to the called destination are busy. In such a case, the SSP servicing the particular destination would transmit a notification back to the SSP-HDT 180 through the CCIS link(s). In response, the HDT 180 transmits a "busy" or "call can not be completed" message to the DET 217 through the signaling channel. Typically, this notice will take the form of a page of text and/or graphics indicating the failure to complete the call, the reason for the failure (e.g. busy or equipment fault) and/or possibly suggesting further options (e.g. to select another service). The DET 217 provides signals to generate a corresponding output display on the associated television set 217'.

The above discussion of call processing for packet switched data and broadband calls has concentrated on processing of outgoing calls because, in the initial embodiment, broadband services are selected only from the user's location, to insure privacy and prevent dumping of 'junk mail' advertisements on viewers through the broadband and packet data network services. In future, however, VIPs will also initiate broadband and packet data calls to individual subscribers.

Other modifications are also possible. For example, if the VIP's level 2 gateway did not have SS7 type CCIS signaling capabilities, the SSP ATM switch connected to the server would function as the terminating end-office in the CCIS based call processing routines for broadband interactive sessions discussed above. If the VIP wanted to establish a screening procedure, a terminating attempt trigger is set in the ATM switch and an appropriate CPR is established in database(s) 97 within the ISTP pair serving that office. The CPR might list subscribers or subscribers terminals from which the particular VIP will accept calls.

Although several preferred embodiments of the invention have been described in detail above, it should be clear that the present invention is capable of numerous modifications as would be apparent to one of ordinary skill in the art. Such modifications fall within the purview of the appended claims.

We claim:

1. A network comprising:

local narrowband communication links;

a telephone trunk circuit;

a broadband trunk circuit supplying broadband digital service signals;

a telephone central office switching system selectively providing switched telephone call communications services to a plurality of telephone stations coupled thereto through the local narrowband communication links;

a local router coupled to the telephone trunk circuit and the broadband trunk circuit, said local router selectively providing switched telephone call communications services to a plurality of telephone stations coupled thereto and selectively providing broadband digital services to a plurality of digital terminals coupled thereto;

a signaling transfer point for routing signaling messages; and signaling links coupling the signaling transfer point to the telephone central office switching system and the local router, said signaling links being separate from the local communication links and the trunk circuit;

wherein the signaling transfer point comprises:

(1) a data switch for switching messages between the signaling links, (2) a database storing call processing data for control of at least some call processing through the telephone central office switching system and the local router, (3) a program controlled processor recognizing a predetermined condition with regard to at least one call related signaling message from one of the central office switching system and the local router which is processing a call, in response thereto obtaining call processing information from the database, and transmitting a signaling message containing the call processing information to the one of the central office switching system and the local router to control subsequent processing of the call.

2. A network as in claim 1, wherein:

the local narrowband communication links are telephone links; and the central office switching system is a telephone switch.

3. A network as in claim 2, wherein a plurality of the telephone links are telephone lines.

4. A network as in claim 1, wherein the signaling transfer point is adapted for sending and receiving signaling system 7 (SS7) signaling messages.

5. A network as in claim 1, wherein the data switch comprises a packet data switching fabric.

6. A network as in claim 1, further comprising a source which broadcasts digitized and compressed video programs over the broadband trunk circuit as said broadband digital service signals.

7. A network as in claim 1, further comprising a broadband switch providing selective broadband digital communications from interactive broadband servers operated by a plurality of information providers through the broadband trunk circuit to the local router.

8. A network as in claim 7, wherein the broadband switch is an Asynchronous Transfer Mode switch.

9. A network as in claim 7, wherein the broadband switch includes:

a processor controlling operations of the broadband switch; and an interface coupling the processor controlling operations of the broadband switch to one signaling link coupled to the signaling transfer point, such that the processor controlling operations of the broadband switch sends and receives call control signaling messages via the signaling transfer point and the one signaling link.

10. A network as in claim 1, further comprising:

a multiplexed line carrying broadband service signals for services selected by a plurality of subscribers served by the local router, telephone signals for the plurality of subscribers and packet data signals for the plurality of subscribers from the local router; and means for coupling the telephone signals to telephone stations on the premises of the plurality of subscribers and for coupling the broadband service signals and packet data signals on the multiplexed line to at least one terminal on premises of each of the plurality of subscribers.

11. A network as in claim 1, further comprising:

a broadband switch;

an information server selectively supplying broadband information through a port coupled to the broadband switch;

a level 2 gateway controlling operations of said server, wherein said level 2 gateway sends and receives call control signaling messages to and from the signaling transfer point via one of the signaling links.

12. An intelligent signaling transfer point comprising:

interface modules for providing two-way data communications to a plurality of common channel interoffice signaling links coupled to a narrowband switching office and at least one local router providing narrowband and broadband communication services of a communication network;

a data switch for switching messages between the interface modules;

a database storing call processing data associated with a plurality of narrowband local communication links and broadband communication links of the communication network for control of at least some narrowband call processing through the narrowband central office switching system and at least some narrowband call processing through the local router and at least some broadband call processing through the local router; and a program controlled processor recognizing predetermined conditions regarding call related signaling messages from the narrowband switching office and the local router, and in response thereto obtaining call processing information from the database, and transmitting signaling messages containing the call processing information to the narrowband switching office and the local router, respectively, to control subsequent processing of calls.

13. An intelligent signaling transfer point as in claim 12, wherein the data switch comprises a packet data switching fabric.

14. An intelligent signaling transfer point as in claim 12, wherein the interface modules and the data switch are adapted for sending and receiving signaling system 7 (SS7) compliant signaling messages.

15. In a system comprising:

a broadband communication network selectively providing broadband communications links through a plurality of control nodes;

a plurality of information servers connected to the broadband communication network, each information server being capable of transmitting broadband digital information via a broadband communication link through the broadband communication network;

a plurality of terminals for transmitting control signals upstream through the broadband communication network in response to user inputs and for providing displays in response to information received through the broadband communication network;

a plurality of telephone switching offices;

a signaling transfer point;

a plurality of signaling links, separate from communication links through the broadband communication network and communication links through the telephone switching offices, said signaling links coupling the control nodes of the broadband communication network and the telephone switching offices to the signaling transfer point, a method comprising the steps of:

receiving a selection signal representing selection of a broadband service call from one of the terminals at one of the control nodes of the broadband communication network;

in response to the selection signal, transmitting a query message containing information relating to the broadband service call over one of the signaling links to the signaling transfer point;

accessing a database in the signaling transfer point based on at least a portion of the information contained in the query message to retrieve call processing information;

in response to the call processing information, sending a response message back to the one control node over one of the signaling links; and providing a broadband communication service through the one control node to the one terminal in response to said response message.

16. A method as in claim 15, wherein the step of providing a broadband service comprises routing a digital broadcast signal through the one control node to the one terminal.

17. A method as in claim 15, wherein the step of providing a broadband service comprises establishing a point-to-point session between a selected one of the information servers and the one terminal through the one control node.

18. A method as in claim 15, further comprising:

receiving another selection signal representing selection of another broadband service call from another terminal at the one control node;

in response to said another selection signal, accessing data stored in the one control node; and utilizing the data accessed in the one control node to provide another broadband service to said another terminal.

19. A method as in claim 18, wherein:

the service selected by and provided to the one terminal is a premium video broadcast service available to a limited number of broadband service subscribers; and the service selected by and provided to said another terminal is a basic video broadcast service available to all of the broadband service subscribers.

20. A method as in claim 18, wherein:

the service selected by and provided to the one terminal is a pay-per-view video broadcast service; and the service selected by and provided to said another terminal is a basic video broadcast service available to all of the broadband service subscribers.

21. A method as in claim 18, wherein:

the service selected by and provided to the one terminal is a point to point interactive communication with a control device and a broadband server operated by an interactive broadband service provider; and the service selected by and provided to said another terminal is a video broadcast service.

22. A method as in claim 21, wherein the control device and the broadband server provide a video on demand service.

23. In a system comprising:

a broadband communication network selectively providing broadband communications links through a plurality of control nodes;

a plurality of information servers connected to the broadband communication network, each information server being capable of transmitting broadband digital information via a broadband communication link through the broadband communication network;

a plurality of terminals for transmitting control signals upstream through the broadband communication network in response to user inputs and for providing displays in response to information received through the broadband communication network;

a plurality of telephone switching offices;

a signaling transfer point;

a plurality of signaling links, separate from communication links through the broadband communication network and communication links through the telephone switching offices, said signaling links coupling the control nodes of the broadband communication network and the telephone switching offices to the signaling transfer point, a method comprising the steps of:

receiving a selection signal representing selection of a broadband service call from one of the terminals at a first one of the control nodes of the broadband communication network;

in response to the selection signal, transmitting a query message containing information relating to the broadband service call over one of the signaling links to the signaling transfer point;

accessing a database in the signaling transfer point based on at least a portion of the information contained in the query message to retrieve call processing information;

based on the call processing information, routing the query message to a second one of the control nodes of the broadband communication network; and establishing a broadband session through the first control node between the one terminal and one of the information servers coupled to the second control node in response to the query message.

24. A method as in claim 23, wherein the second control node is a gateway controlling operation of the one information server.

25. A method as in claim 23, wherein the second control node is a broadband switch, coupled to the one information server, selectively providing a point to point communication link between the one information server and the first control node.

26. A method as in claim 23, wherein the query message is a standard common channel interoffice signaling (CCIS) message.

27. A method as in claim 26, wherein the query message conforms to a query message format specified by signaling system 7 (SS7) protocol.

28. A method as in claim 27, wherein the query message is an ISDN-UP query.

29. A method as in claim 28, wherein the ISDN-UP query is an Initial Address Message (IAM) type query.

30. In a system comprising:

a broadband communication network selectively providing broadband communications links through a plurality of control nodes;

a plurality of information servers connected to the broadband communication network, each information server being capable of transmitting broadband digital information via a broadband communication link through the broadband communication network;

a plurality of terminals for transmitting control signals upstream through the broadband communication network in response to user inputs and for providing displays in response to information received through the broadband communication network;

a plurality of telephone switching offices;

a signaling transfer point;

a plurality of signaling links, separate from communication links through the broadband communication network and communication links through the telephone switching offices, said signaling links coupling the control nodes of the broadband communication network and the telephone switching offices to the signaling transfer point, a method comprising the steps of:

receiving a selection signal representing selection of a broadband service call from one of the terminals at a first one of the control nodes of the broadband communication network;

in response to the selection signal, transmitting a query message containing information relating to the broadband service call and address information over one of the signaling links to the signaling transfer point;

accessing a database in the signaling transfer point based on at least a portion of the information contained in the query message to retrieve call processing information;

based on the call processing information and the information relating to the broadband service call determining which of a first condition and a second condition is satisfied;

if the first condition is satisfied:

(a) formulating a first response message in the signaling transfer point based on the information contained in the query message, and (b) transmitting the first response message to the first control node over one of the signaling links; if the second condition is satisfied:

(a) routing the query message to a second control node of the broadband communication network based on the address information, and (b) formulating a second response message in the second control node, and (c) transmitting the second response to the first control node through signaling links and the signaling transfer point; and controlling broadband service through at least the first control node to the one terminal in response to either the first response message or the second response message.

31. A method as in claim 30, wherein the messages are standard common channel interoffice signaling (CCIS) messages.

32. A method as in claim 30, wherein the messages conform to formats specified by signaling system 7 (SS7) protocol.

33. A method as in claim 30, wherein the second control node is a gateway controlling operation of one of the information servers.

34. A method as in claim 30, wherein the second control node is a broadband switch, coupled to one of the information servers, for selectively providing point to point communication links between the information servers and the first control node.

* * * * *